US006513051B1

(12) United States Patent
Bolosky et al.

(10) Patent No.: US 6,513,051 B1
(45) Date of Patent: Jan. 28, 2003

(54) METHOD AND SYSTEM FOR BACKING UP AND RESTORING FILES STORED IN A SINGLE INSTANCE STORE

(75) Inventors: William J. Bolosky, Issaquah, WA (US); Scott M. Cutshall, Carnation, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/356,383

(22) Filed: Jul. 16, 1999

(51) Int. Cl.[7] .............................................. G06F 17/30
(52) U.S. Cl. ...................... 707/204; 707/200; 707/201; 707/205; 707/101; 707/102; 711/161; 711/162
(58) Field of Search ................................. 707/200–206, 707/100–102, 1; 711/161, 162

(56) References Cited

U.S. PATENT DOCUMENTS

| 5,410,667 A | * | 4/1995 | Belsan et al. ................ 395/425 |
| 5,706,510 A | | 1/1998 | Burgoon |
| 5,778,384 A | | 7/1998 | Provino et al. |
| 5,778,395 A | * | 7/1998 | Whiting et al. .............. 707/204 |
| 5,907,673 A | | 5/1999 | Hirayama et al. |
| 5,918,229 A | | 6/1999 | Davis et al. |
| 6,185,574 B1 | | 2/2001 | Howard et al. |

FOREIGN PATENT DOCUMENTS

| EP | 0 774 715 A1 | 5/1997 | |
| WO | WO 99/09480 | 2/1999 | |
| WO | WO 99/12098 | 3/1999 | |
| WO | 99/12098 WO* | 3/1999 | ..................... 11/14 |
| WO | WO 99/21082 | 4/1999 | |

OTHER PUBLICATIONS

LaLonde, Ken, "Batch daemon—README", UNIX Batch Command, University of Toronto, pp. 1–3 (Feb. 27, 1997), ftp://ftp.cs.toronto.edu/pub/batch.tar.z printed Dec. 8, 2000.
Steere et al., "A Feedback–driven Proportion Allocator for Real–Rate Scheduling", *Third Symposium on Operating Systems Design and Implementation (OSDI '99)*, USENIX Association, pp. 145–158 (1999).
Copy of International Search Report from corresponding PCT Application No. PCT/US00/1890 mailed Nov. 24, 2000.

* cited by examiner

*Primary Examiner*—Hosain T. Alam
*Assistant Examiner*—Joon Hwan Hwang
(74) *Attorney, Agent, or Firm*—Law Offices of Albert S. Michalik, PLLC

(57) ABSTRACT

A method and system for backing up and restoring single instance store (SIS) files comprising links to common store files. A dynamic link library (DLL) including an interface enables a backup/restore application to properly backup and restore SIS-enabled volumes including SIS links and their corresponding store files. For each link to be backed up, the DLL tracks whether its corresponding common store file has already been identified for backing up to the backup application, such that it is identified only once, whereby only one copy of a common store file is backed up per volume, regardless of the number of additional links pointing thereto. For each link to be restored, the DLL tracks whether its corresponding common store file has already been identified for restoring to the restore application, or is already present on the volume, whereby a common store file for a link file is only restored to a volume only once and if not already present on that volume.

27 Claims, 18 Drawing Sheets

METHOD AND SYSTEM FOR BACKING UP AND RESTORING FILES STORED IN A SINGLE INSTANCE STORE

TECHNICAL FIELD

The invention relates generally to computer systems and data storage, and more particularly to the backing up and restoring of files of a file system.

BACKGROUND OF THE INVENTION

The contents of a file of a file system may be identical to the contents stored in one or more other files. While some file duplication tends to occur on even an individual user's personal computer, duplication is particularly prevalent on networks set up with a server that centrally stores the contents of multiple personal computers. For example, with a remote boot facility on a computer network, each user boots from that user's private directory on a file server. Each private directory thus ordinarily includes a number of files that are identical to files on other users' directories. As can be readily appreciated, storing the private directories on traditional file systems consumes a great deal of disk and server file buffer cache space.

Techniques that have been used to reduce the amount of used storage space include linked-file or shared memory techniques, essentially storing the data only once. However, when these techniques are used in a file system, the files are not treated as logically separate files. For example, if one user makes a change to a linked-file, or if the contents of the shared memory change, every other user linked to that file sees the change. This is a significant drawback in a dynamic environment where files do change, even if not very frequently. For example, in many enterprises, different users need to maintain different versions of files at different times, including traditionally read-only files such as applications. As a result, linked-file techniques would work well for files that are strictly read-only, but these techniques fail to provide the flexibility needed in a dynamic environment.

Additional problems arise any time that a distinct file is linked to its data rather than having the file metadata and actual data treated as a whole. For example, when dealing with linked files, the file data may be lost if a link to the file data is backed up, but not the data itself. As can be readily appreciated, such a situation is unacceptable in critical data backup and retrieval situations, but nonetheless may occur if the user does not know that the backed-up link is actually distinct from the data. On the other hand, if the data is automatically backed up for each link, then the amount of storage space needed to make the backup may be far larger than the amount of space that the links and data actually occupy on the machine being backed up. For example, a user may overflow a backup storage device if roughly 200 megabytes of space is needed to back up the source data for two links, each link pointing to the same 100 megabytes of file data, (i.e., the links and data occupy approximately 100 megabytes at the source). Similarly, when restoring, the amount of data on the storage device may not correspond to the amount the user expects to restore. For example, if the 200 megabytes did fit on the backup storage device, the user backed up what appeared to be 100 megabytes and thus expects that the restore program will put back 100 megabytes, not 200 megabytes. In sum, there has heretofore not been a way to properly handle the backing up and restoring of files having their data stored in a single instance representation thereof.

SUMMARY OF THE INVENTION

Briefly, the present invention provides a method and system for backing up and restoring single instance files including link files and common store files pointed to by those link files. The method and system, which may be implemented in an interface such as in a dynamic link library, receive information corresponding to a link file, such as via a function call from a backup application, and determine whether the link file has common data corresponding thereto already identified for backup. If not, the interface identifies the common data (e.g., returns a common store filename) to back up. A data structure may be used to track which common data has already been identified to the backup application. In this manner, one, but only one copy of the common data will be identified for backup.

The interface may also receive function calls specifying a link file from a restore application, whereby the interface determines whether common data corresponding to the link file needs to be restored. To this end, the interface identifies the common store data (e.g., via a common store filename) when the common data has neither been previously identified to the restore application nor is already present on the volume. A data structure may be used to track whether common data has already been identified to the backup application, and/or is known to be present on the volume. In this manner, one, but only one copy of the common data will be identified for restore, and only if the common data is not already present on the volume.

Other advantages will become apparent from the following detailed description when taken in conjunction with the drawings, in which:

DETAILED DESCRIPTION OF THE INVENTION

Exemplary Operating Environment

Figure 1:
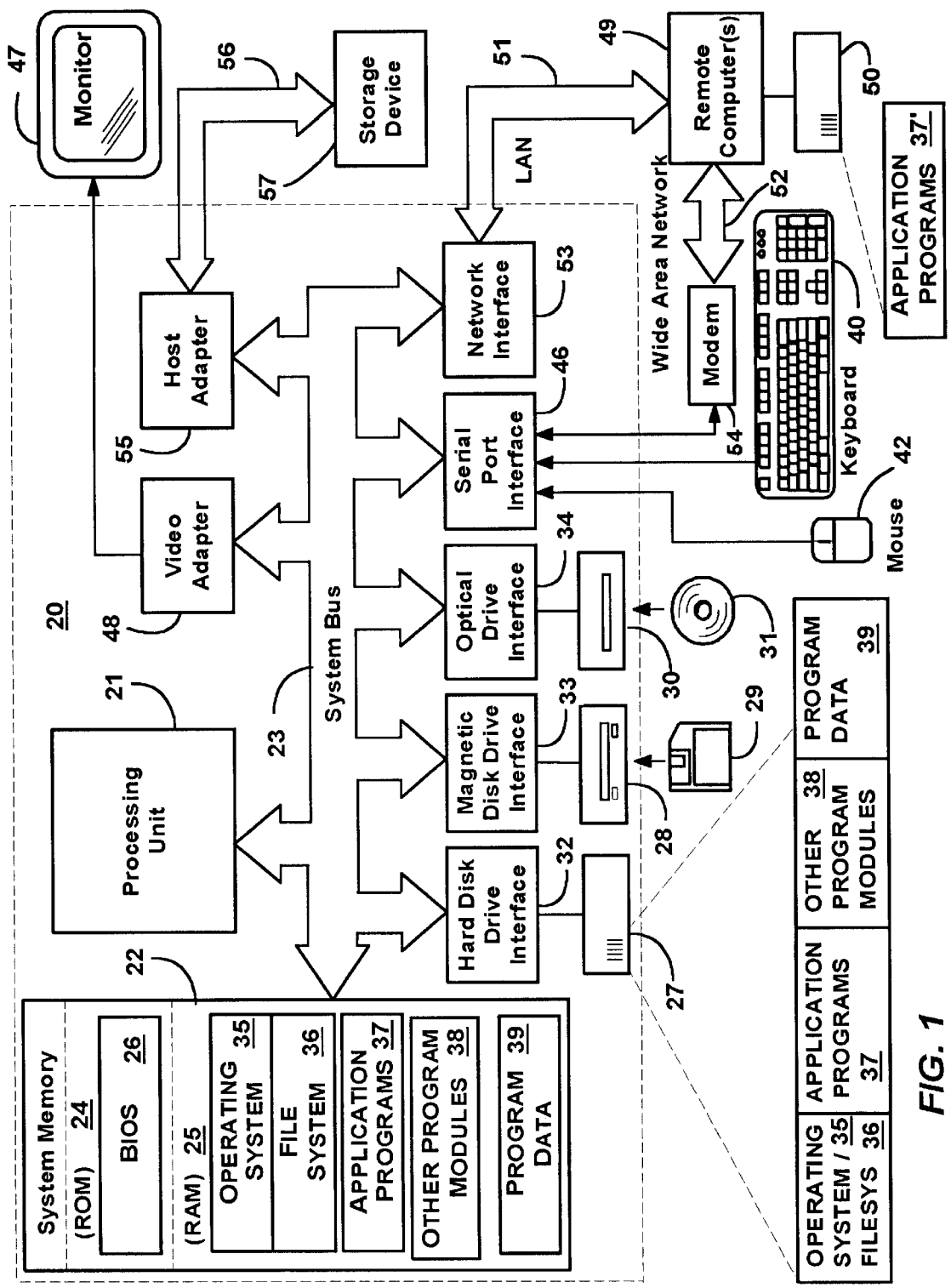
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows® 2000). The computer 20 includes a file system 36 associated with or included within the operating system 35, such as the Windows NT® File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The present invention is described herein with reference to Microsoft Corporation's Windows 2000 (formerly Windows NT®) operating system, and in particular to the Windows NT® file system (NTFS). Notwithstanding, there is no intention to limit the present invention to Windows® 2000, Windows NT® or NTFS, but on the contrary, the present invention is intended to operate with and provide benefits with any operating system, architecture and/or file system that needs to back up and restore store duplicated data stored in a single instance representation thereof.

Single Instance Store

Figure 2A:
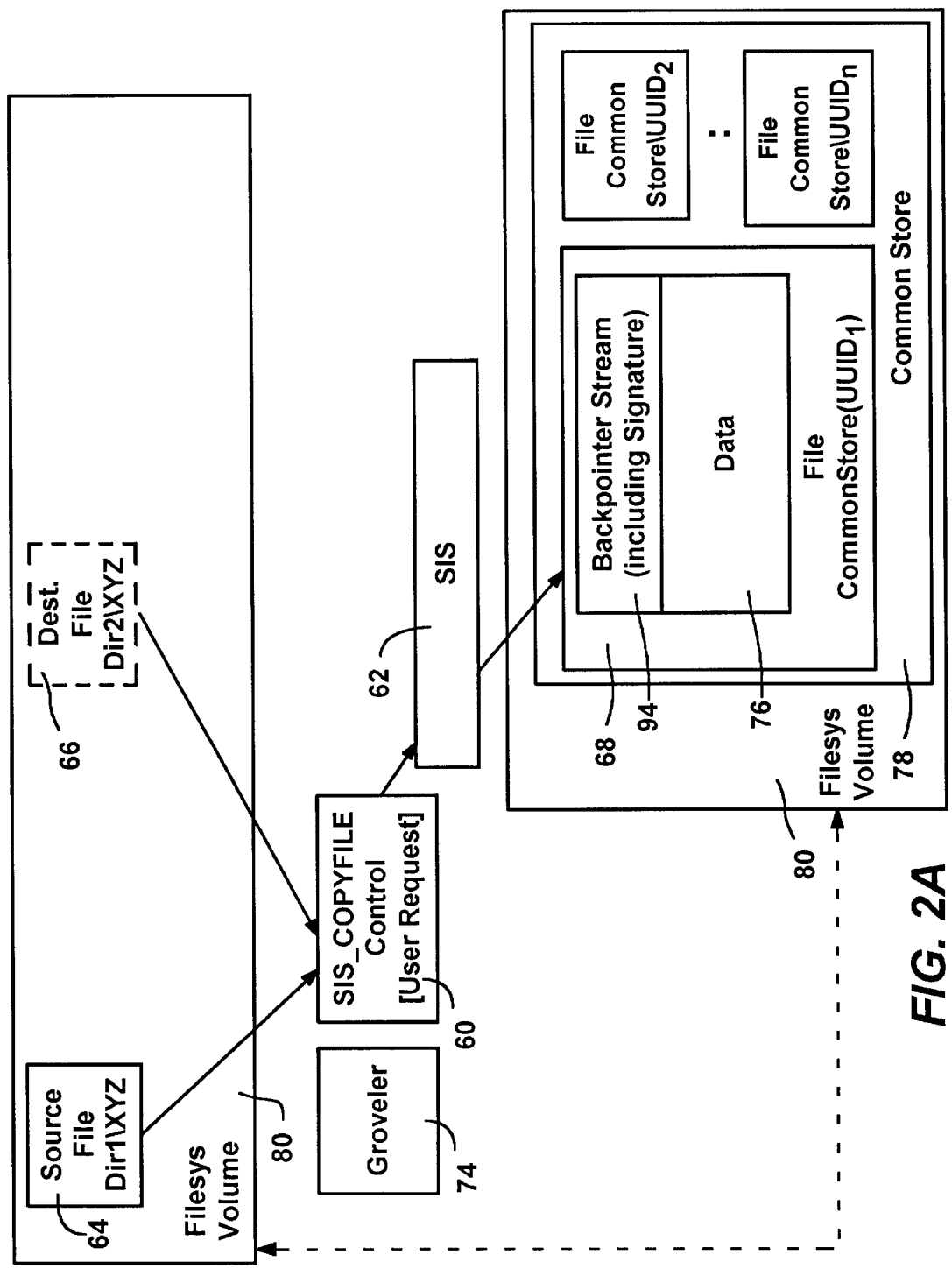
FIGS. 2A–2B are block diagrams representing various components for working with single instance store (SIS) link files and SIS common store files, including the backing up and restoring thereof in accordance with an aspect of the present invention.
Figure 2B:
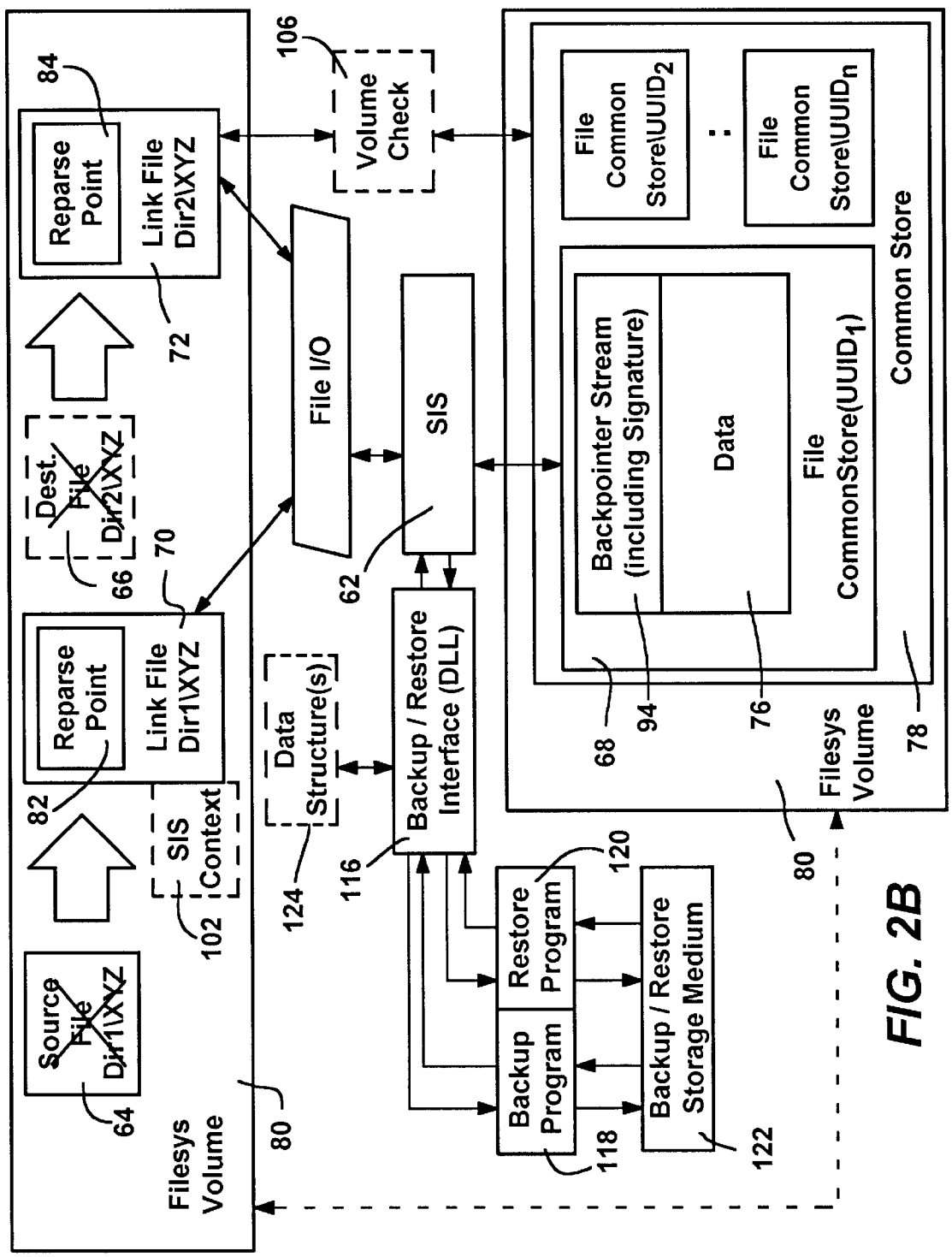

Turning now to FIGS. 2A–2B, there is shown a general concept of the single instance store (SIS) facility and architecture underlying the present invention, which may be implemented in the computer system 20. In FIG. 2A, a user, via a SIS copy file request 60 to a SIS facility 62, may explicitly request that a source file 64 be copied to a destination file 66 as a SIS copy of the file. Note that the destination file 66 ordinarily does not exist at this time, and is thus represented in FIGS. 2A and 2B by a dashed box. The preferred copy file request 60 may be implemented as a Windows 2000 file system control named SIS_COPYFILE, recognized by the SIS facility 62. As described in detail below, the SIS_COPYFILE request 60 to the SIS facility 62 normally results in a single instance representation of the original source file data with links thereto, each link corresponding to the source and destination files, respectively. Repeating the process as desired adds links without (substantially) adding to the single copy of the file. In this manner, for example, an administrator user of a file server may place the links for many client users on each user's private directory, while maintaining only one instance of the file on the server. Note that the user need not specify source and destination files, as it is feasible to have a SIS file with only one link thereto, while alternatively, a control may be implemented that allows more than two files to be specified for merging into a single instance representation thereof. It also may occur that the user requests that a SIS file be made from a file that is not a SIS link file but already has a single instance representation thereof. In such an instance, similar to the destination file, the non-SIS link source file may be converted (described below) by the SIS_COPYFILE control to a link to the existing single instance.

As an alternative to the manual SIS copy file operation 60, a user level process that seeks identical files may run (e.g., as a background process) to automatically request merging identical files into a single instance store file. The preferred user level process, known as a "groveler" 74 (FIG. 2A), uses a file system control named SIS_MERGE_FILES as described in copending United States patent application entitled "Method and System for Automatically Merging Files Into a Single Instance Store," assigned to the assignee of the present invention, filed concurrently herewith, and hereby incorporated by reference herein in its entirety. In general, after locating identical files, (possibly only those exceeding some threshold size), the result of the automatic actions taken by the groveler 74 with respect to the SIS_MERGE_FILES control provide a similar result to the manual SIS_COPYFILE actions taken by the user, and thus for purposes of simplicity, the groveler actions are not separately described herein in detail.

FIG. 2B shows the result of the SIS_COPYFILE control. In FIG. 2B, the source and destination files are SIS link files 70, 72, while the single instance representation, including the file data 76, is maintained as a common store file 68 in a common store 78. Each SIS link file 70, 72 is a user file that is managed by the SIS facility 62, while the common store 78 is preferably a file system directory that is not intended to be visible or accessible to users. The link files 70, 72 are preferably on the same file system volume 80, as is the common store directory 78. Note that the single instance representation need not actually be a file system file in a common store directory, but may be stored in some other data structure. Thus, as used herein, the terms common store file and/or single instance file are intended to mean any appropriate data structure that can hold at least part of a file's contents.

Figure 5:
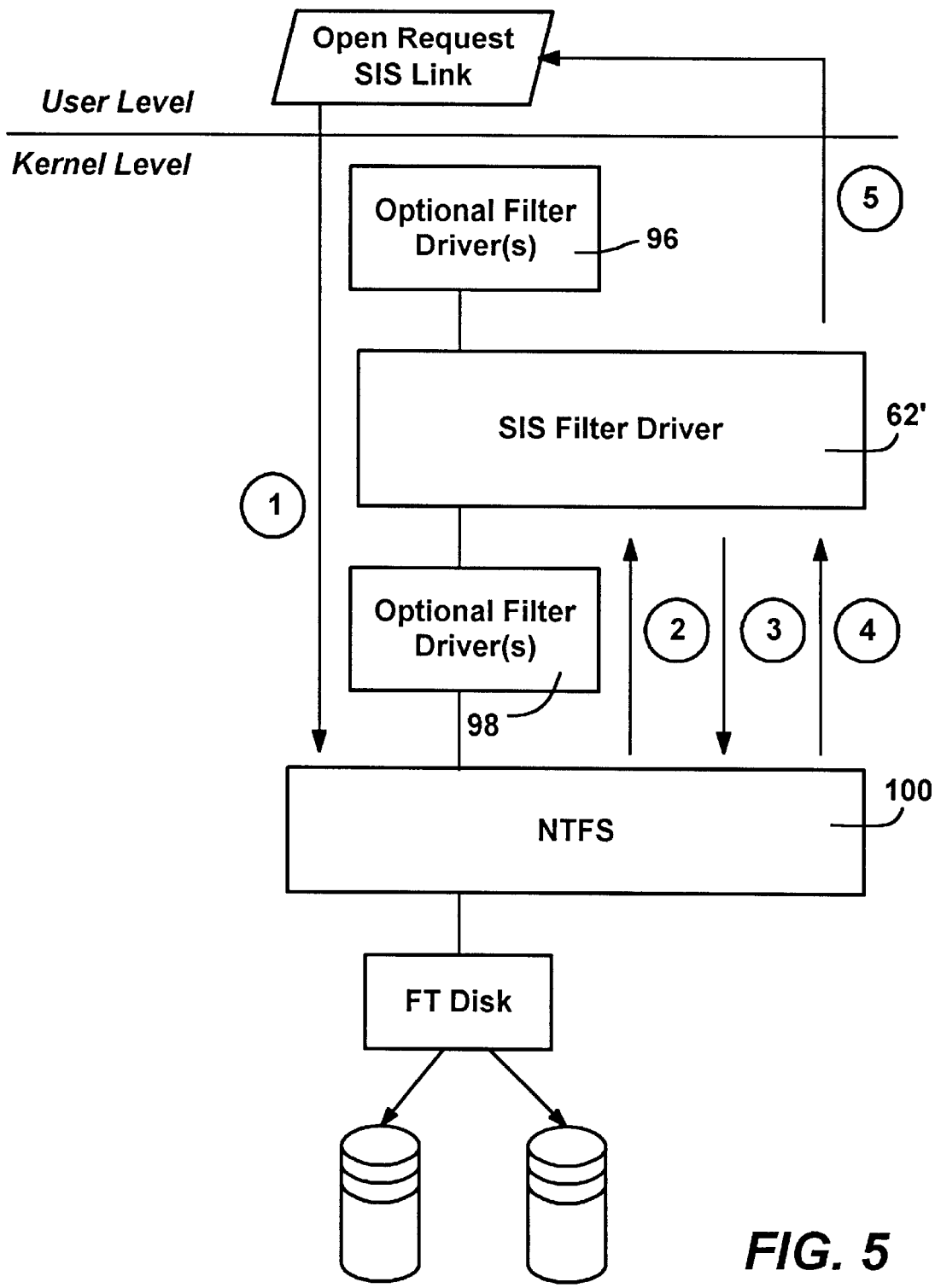
FIG. 5 is a representation of a SIS link file open request passing through a preferred SIS and file system architecture.

For efficiency, the SIS facility 62 may be built into the file system. However, although not necessary to the present invention, primarily for flexibility and to reduce complexity it is preferable in the Windows 2000 environment to implement the SIS facility 62 as a filter driver 62' (FIG. 5). Indeed, the present invention was implemented without changing the Windows NT® file system (NTFS). Notwithstanding, it will be understood that the present invention is not limited to the NTFS filter driver model.

In the NTFS environment, filter drivers are independent, loadable drivers through which file system I/O (input/output) request packets (IRPs) are passed. Each IRP corresponds to a request to perform a specific file system operation, such as read, write, open, close or delete, along with information related to that request, e.g., identifying the file data to read. A filter driver may perform actions to an IRP as it passes therethrough, including modifying the IRP's data, aborting its completion and/or changing its returned completion status.

The SIS link files 70–72 do not include the original file data, thereby reclaiming disk space. More particularly, the link files are NTFS sparse files, which are files that generally appear to be normal files but do not have the entire amount of physical disk space allocated therefor, and may be extended without reserving disk space to handle the extension. Reads to unallocated regions of sparse files return zeros, while writes cause physical space to be allocated. Regions may be deallocated using an I/O control call, subject to granularity restrictions. Another I/O control call returns a description of the allocated and unallocated regions of the file.

Figure 3:
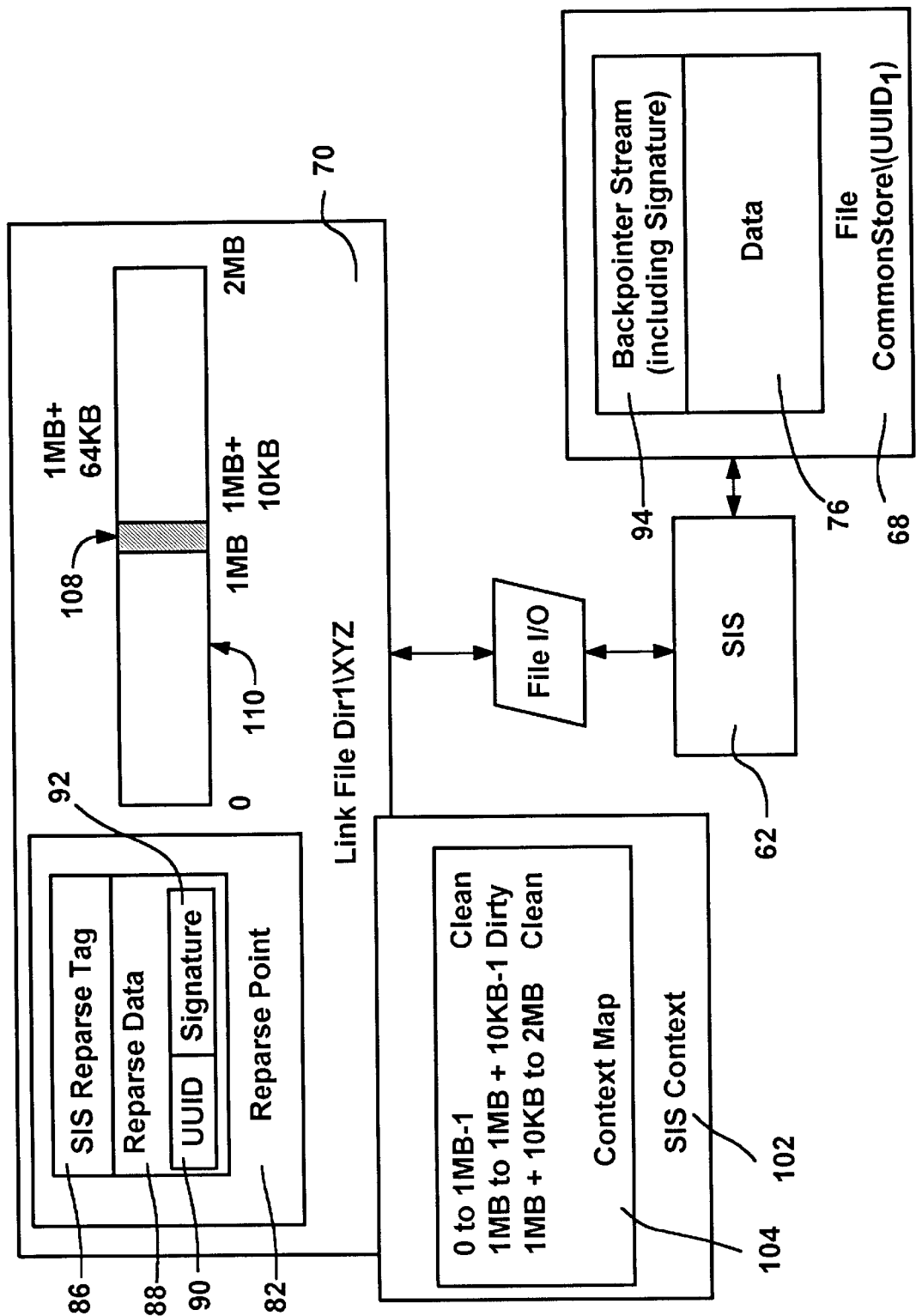
FIG. 3 is block diagram representing various components of a SIS link file and SIS common store file.

The link files 70, 72 include a relatively small amount of data in respective reparse points 82, 84, each reparse point being a generalization of a symbolic link added to a file via an I/O control call. As generally shown in FIG. 3, a reparse point (e.g., 82) includes a tag 86 and reparse data 88. The tag is a thirty-two bit number identifying the type of reparse point, i.e., SIS. The reparse data 88 is a variable-length block of data defined by and specific to the facility that uses the reparse point, i.e., SIS-specific data, as described below.

Figure 4:
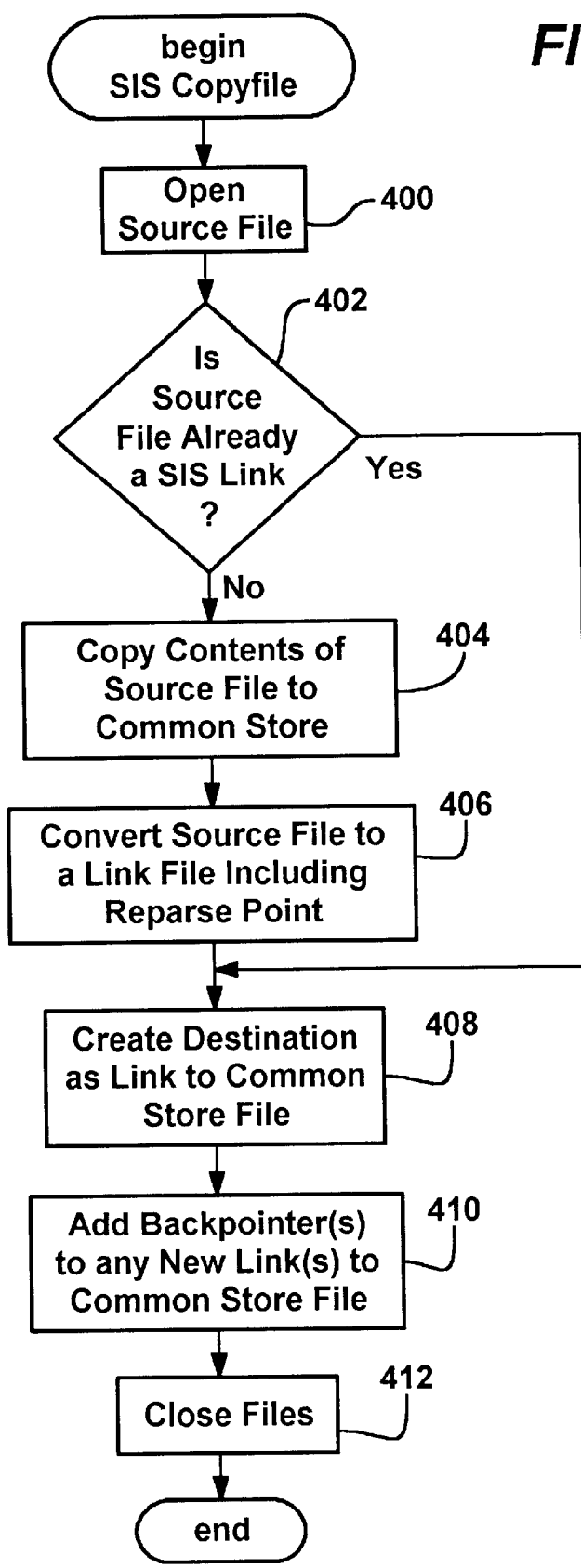
FIG. 4 is a flow diagram generally representing the steps taken when copying a source file to a SIS link file and SIS common store file.

FIG. 4 represents the general flow of operation when a user makes a SIS_COPYFILE control request 60 to SIS copy a source file 64 to a destination file 66 via the SIS driver 62'. The SIS driver 62' receives such requests, and at step 400 first opens the source file 64 to determine whether the file is already a SIS link file by looking for the existence of the SIS reparse point. Note that the user generally does not know whether a file is a SIS link or a regular file. If the source file 64 is already a SIS link, step 402 branches ahead to step 408, described below. Conversely, if the source file 64 is not a SIS link, step 402 branches to step 404 where the contents of the source file 64 are copied as file data 76 to a newly allocated file in the common store 78, i.e., the SIS common store file 68 (FIG. 2A). Note that for efficiency, SIS may employ some threshold test before making the copy, e.g., do not allow the SIS_COPYFILE operation on files less than one kilobyte in size. Further, note that SIS_COPYFILE does an actual copy of the contents of the source file to the common store 78 rather than a rename of the source file 64. The link file 70 thus maintains the file identifier (File ID) number originally assigned by the NTFS to the source file 64, so that user open requests directed to the NTFS file ID are to the link file 70 rather than to the common store file 68. This file ID number is used by SIS to identify the file, whereby any user-renaming of the link file by the user is not an issue. In an alternate embodiment, SIS could use rename in order to avoid copying the file data, possibly at the cost of having the source file's file ID change because of the copy operation.

The common store file 68, in the common store 78, is named based upon a 128-bit universal unique identifier (UUID), shown in FIGS. 2A–2B as the file CommonStore\(UUID$_1$). Using a UUID is particularly beneficial when backing up and restoring SIS files, since files with the same UUIDs are known to be exact copies, and more than one such copy is not needed in the common store 78. The backing up and restoring of SIS links and common store files is described in detail below.

While not shown in FIG. 4, if a copying error occurs, the source file 64 remains unchanged, an appropriate error message is returned to the requesting user, and the SIS_COPYFILE control 60 is terminated. In the normal event where there are no errors in the copying process, step 404 continues to step 406 where the source file 64 is converted to the SIS link file 70 (FIG. 2B).

To convert the source file 64 to the SIS link file 70 at step 406, the SIS_COPYFILE control 60 provides the reparse point 82, including the SIS tag 86, and reparse data 88 including the common store file's unique file identifier 90 and a signature 92 (FIG. 3). The signature 92 is a 64-bit checksum computed by applying a trinomial hash function (known as the 131-hash) to the file data 74. The common store file 68 maintains the signature therewith as part of a backpointer stream 94, described below. The only way to determine the signature is via the file data contents, and thus may be used to provide security by preventing unauthorized access to the contents via non-SIS created reparse points as described below.

As another part of the conversion to a link file 70 at step 406, the data of the file is cleared out using the aforementioned NTFS sparse file technology. The resulting link file 70 thus essentially comprises the reparse point 82 and a shell for the data. At step 408, the destination link file 72 is created in the same general manner, i.e., the link file 72 comprises a reparse point 84 having the same information therein and a shell for the data. Each link file is on the order of approximately 300 bytes in size.

Note that the creation of SIS files when the SIS groveler 74 recognizes identical files (SIS_MERGE_FILES) is similar to the SIS_COPYFILE control 60, except that the "destination" file initially exists and is identical to the "source" file. In general, if a single instance representation of those identical files already exists in the common store 78, the contents are not copied into the common store 78, and the identical, non-SIS files are converted to SIS link files as described above. The SIS_COPYFILE control 60 may similarly be extended when the source file is not already a SIS link, yet a single instance representation 68 of the file data is already in the common store 78, e.g., skip the copying at step 404, but not the conversion of the source file to a link file at step 406.

Step 410 represents the adding of identifiers of any new link files (via conversion, step 406 or creation, step 408) to the backpointer stream 94 maintained in the common store file. As described in more detail below, the backpointers identify to the common store file 68 the link files that point to it. As also described below, backpointers are particularly useful in delete operations, i.e., delete the backpointer when the link file is deleted, but only delete the common store file when it has no more backpointers listed in the stream 94. At this time, the common store file 68 and the links 70, 72 thereto are ready for use as SIS files, and the files are closed as appropriate (step 412).

Turning to FIGS. 5 and 6, there is provided an explanation of how a request to open a link file is handled by the SIS/NTFS architecture. As shown in FIG. 5, an open request in the form of an IRP, (including a file name of a file that has a SIS reparse point), as represented by the arrow with circled numeral one, comes in as a file I/O operation and is passed through a driver stack. The driver stack includes the SIS filter driver 62' with other optional filter drivers 96, 98 possibly above and/or below the SIS filter driver 62'. For purposes of the examples herein, these other filter drivers 96, 98 (shown herein for completeness) do not modify the IRPs with respect to SIS-related IRPs. At this time, the SIS filter driver 62' passes the IRP on without taking any action with respect thereto, as it is generally not possible to determine if a given filename corresponds to a file with a reparse point until NTFS processes the open request.

Figure 6A:
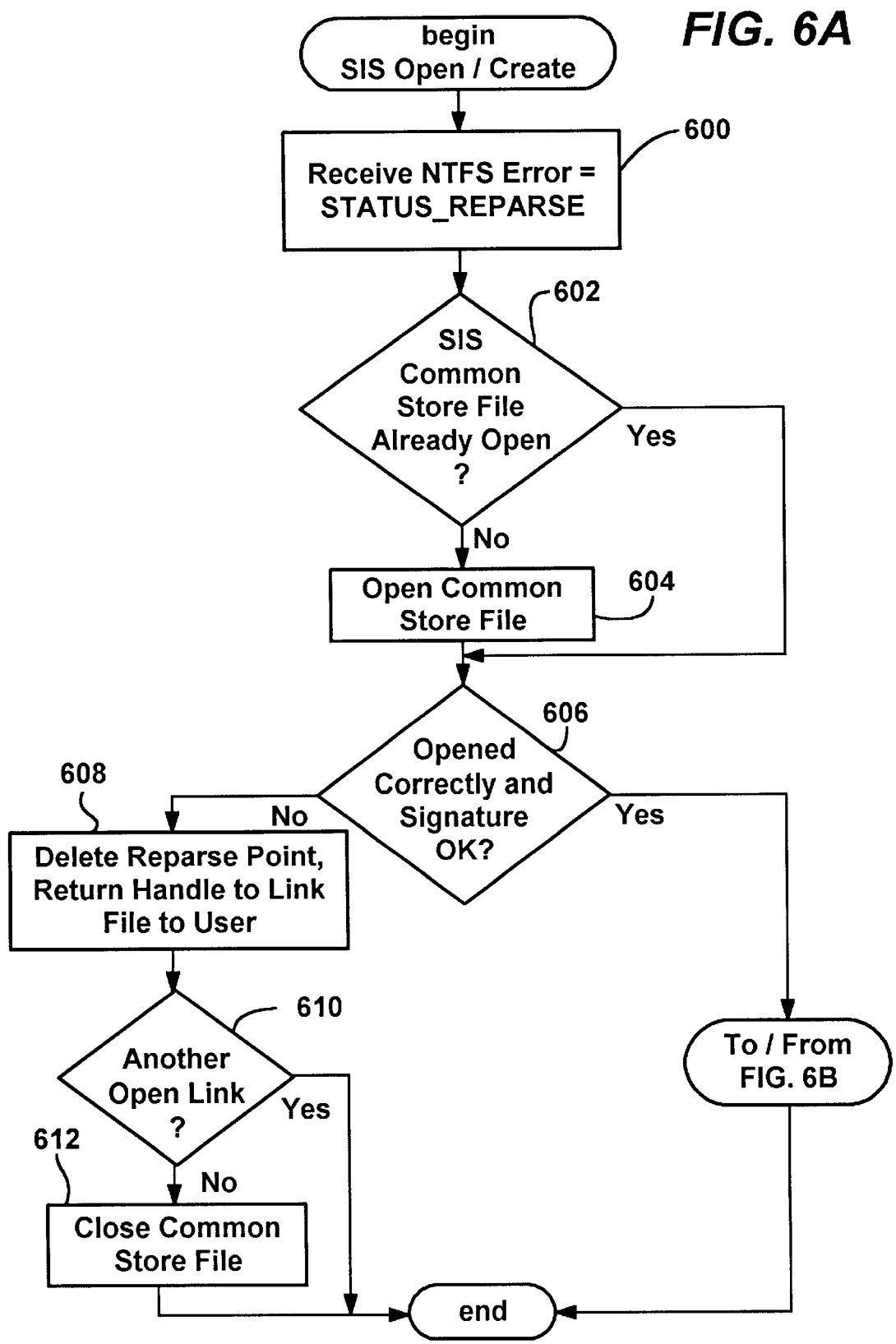
FIGS. 6A–6B comprise a flow diagram generally representing the steps taken by the SIS facility to handle the open request represented in FIG. 5.
Figure 6B:
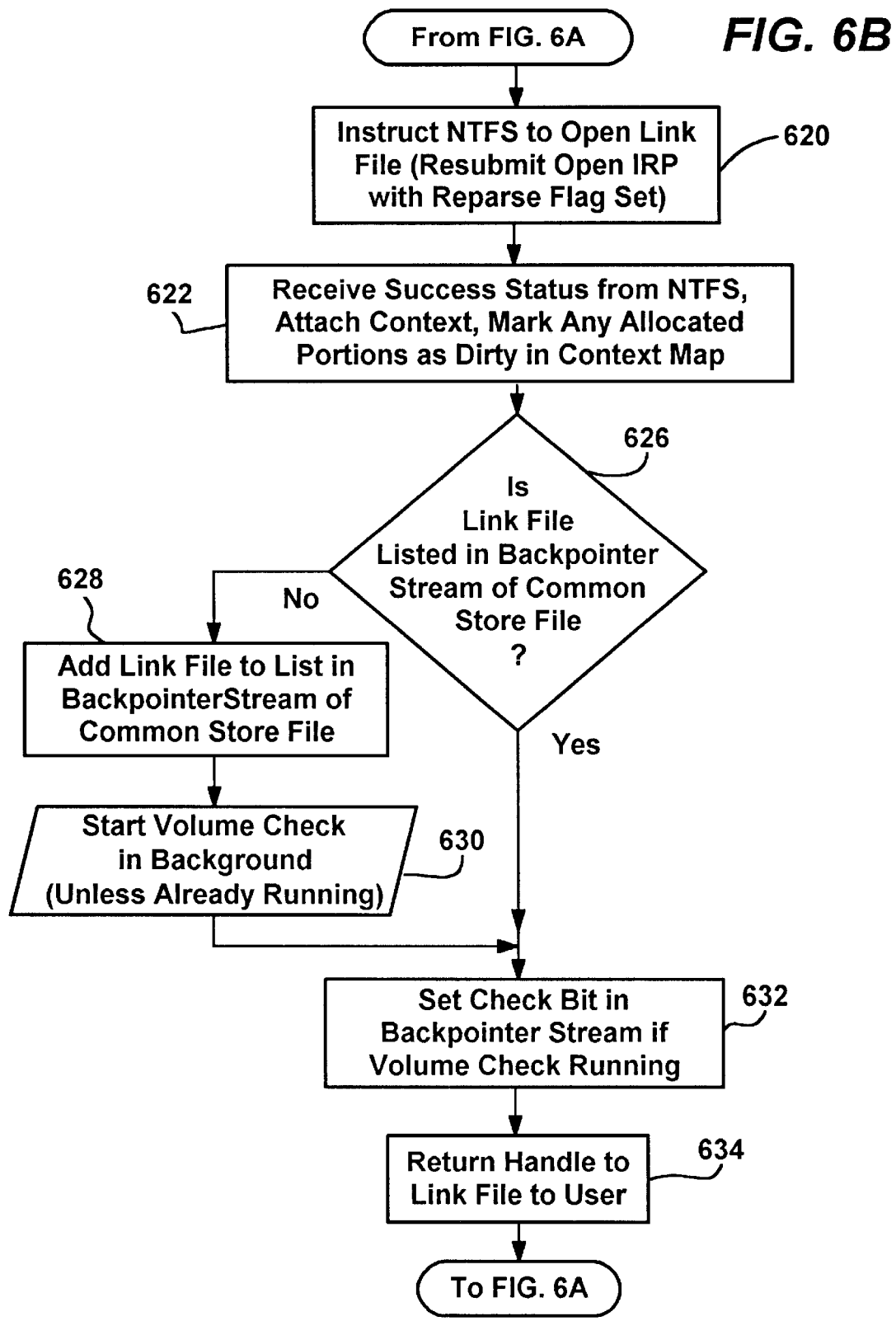

When the SIS link open IRP reaches the NTFS 100, the NTFS 100 recognizes that the file named in the IRP has a reparse point associated therewith. Without further instruction, the NTFS 100 does not open files with reparse points. Instead, the NTFS 100 returns the IRP with a STATUS_REPARSE completion error and with the contents of the reparse point attached, by sending the IRP back up the driver stack, as represented in FIG. 5A by the arrow with circled numeral two. As represented in FIG. 6A, at step 600 the SIS filter 62' receives the STATUS_REPARSE error and recognizes the IRP as having a SIS reparse point.

In response, via steps 602–604, the SIS filter 62' opens the common store file 68 identified in the reparse point if the common store file 68 is not already open, and reads the signature therein. This is accomplished by the SIS filter 62' sending separate IRPs to NTFS 100 identifying the common store file by its UUID name 90 (FIG. 3) in the reparse point 82, and then requesting a read of the appropriate data. Then, at step 606, if the open proceeded correctly, the SIS filter 62' compares the signature 92 in the reparse point with the signature in the backpointer stream 94 of the common store file 68. If they match, step 606 branches to step 620 of FIG. 6B as described below. However, if the signatures do not match, the SIS filter 62' allows the open to proceed by returning a file handle to the link file to the user, but without attaching SIS context to the opened file, essentially denying access to the common store file 68 for security reasons.

More particularly, a SIS reparse point may be generated external to SIS, including the UUID-based name of a common store file, a name which can be guessed in a relatively straightforward manner. As a result, without the signature check, such an externally-generated reparse point could give potentially unauthorized access to the common store file. However, since the SIS-reparse point has a signature, and the signature may only be computed by having access to the file data, only those who already have access to the file data can know the signature and provide a valid SIS-reparse point. The file data in the common store is thus as secure as the file data was in the original source file.

If the signature does not match at step 606, step 608 returns access to the link file without corresponding access to the common store file to the user. Step 610 then tests to see if another link file has the common store file open, and if not, step 612 closes the common store file 68. More particularly, SIS maintains a data object that represents the common store file, and the common store file data object keeps a reference count of open link files having a reference thereto. Step 610 essentially decrements the reference count and checks to see if it is zero to determine whether it needs to close the common store file handle. Note that valid users are thus not stopped from working with their valid links to the common store file 68 if an invalid reparse point is encountered during the valid users' sessions.

If the signatures match at step 606, at step 620 the SIS filter driver 62' sets a FILE_OPEN_REPARSE_POINT flag in the original link file open IRP, and returns the IRP to the NTFS 100, as shown in FIG. 5 by the arrow with circled numeral three. This flag essentially instructs the NTFS 100 to open the link file 70 despite the reparse point. As shown in FIG. 5 by the arrow with circled numeral four, the NTFS 100 returns success to the SIS filter 62' along with a file object having a handle thereto (assuming the open was successful). At step 622 of FIG. 6B, when the success is received, the SIS filter driver 62' attaches context 102 (FIG. 2B) to the file object, including a context map 104 (FIG. 3) that will be used to indicate any portions of the link file that have been allocated to data. Note that the context 102 is an in memory structure and only attached while the file is open, and is thus represented by a dashed box in FIG. 2B to reflect its transient nature. If the link file has any allocated data portions, those portions are marked in the map 104 in the context as "dirty" at step 622. A link file having allocated data when first opened is a special case situation that occurs, for example, when the disk volume 80 was full, as described below.

At step 626, a check is made to ensure that the link file's identifier is listed among the backpointers in the backpointer stream 94 of the common store file 68. It is possible for the list of backpointers in the stream 94 to become corrupted (e.g., when the SIS filter driver 62' is not installed) whereby the link file 70 is not listed. If not listed at step 626, the link file's identifier, which is known to identify a valid link, is added to the list of backpointers 94 at step 628, and a volume check procedure 106 (FIG. 2B) is started at step 630 (unless already running). The volume check 106 essentially works with the backpointer streams of the various common store files ($UUID_1$–$UUID_n$) so that common store files do not contain backpointers to link files that do not exist, so that common store files do not remain and use disk space without at least one link pointing thereto, and so that each valid link file has a backpointer in the corresponding common store file. At step 632, if volume check 106 is running, a check bit, used by the volume check 106, is set to one in the backpointer for the file each time that link file is opened. The volume check 106 and check bit are described in copending United States patent application entitled "Single Instance Store for File Systems," assigned to the assignee of the present invention, filed concurrently herewith, and hereby incorporated by reference herein in its entirety.

At step 634, the handle to the link file is returned to the user, shown in FIG. 5 by the arrow with circled numeral five. Note that the user thus works with the link file 70, and generally has no idea that the link file 70 links the file to the common store file 68. At this time, assuming the signature was correct and the opens were successful, the user has a handle to the link file 70 and the common store file 68 is open.

Writing to a SIS link file 70 does not change the common store file 68, since other links to the common store file 68 are logically separate. Instead, write requests are written to space allocated therefor in the link file 70, as described below. In this manner, changing the data via one link does not result in changes seen by the other links. Thus, by "logically separate" it is meant that in a SIS link, changes made to one link file are not seen by users of another link file, in contrast to simply having separate file names, protections, attributes and so on.

Figure 7:
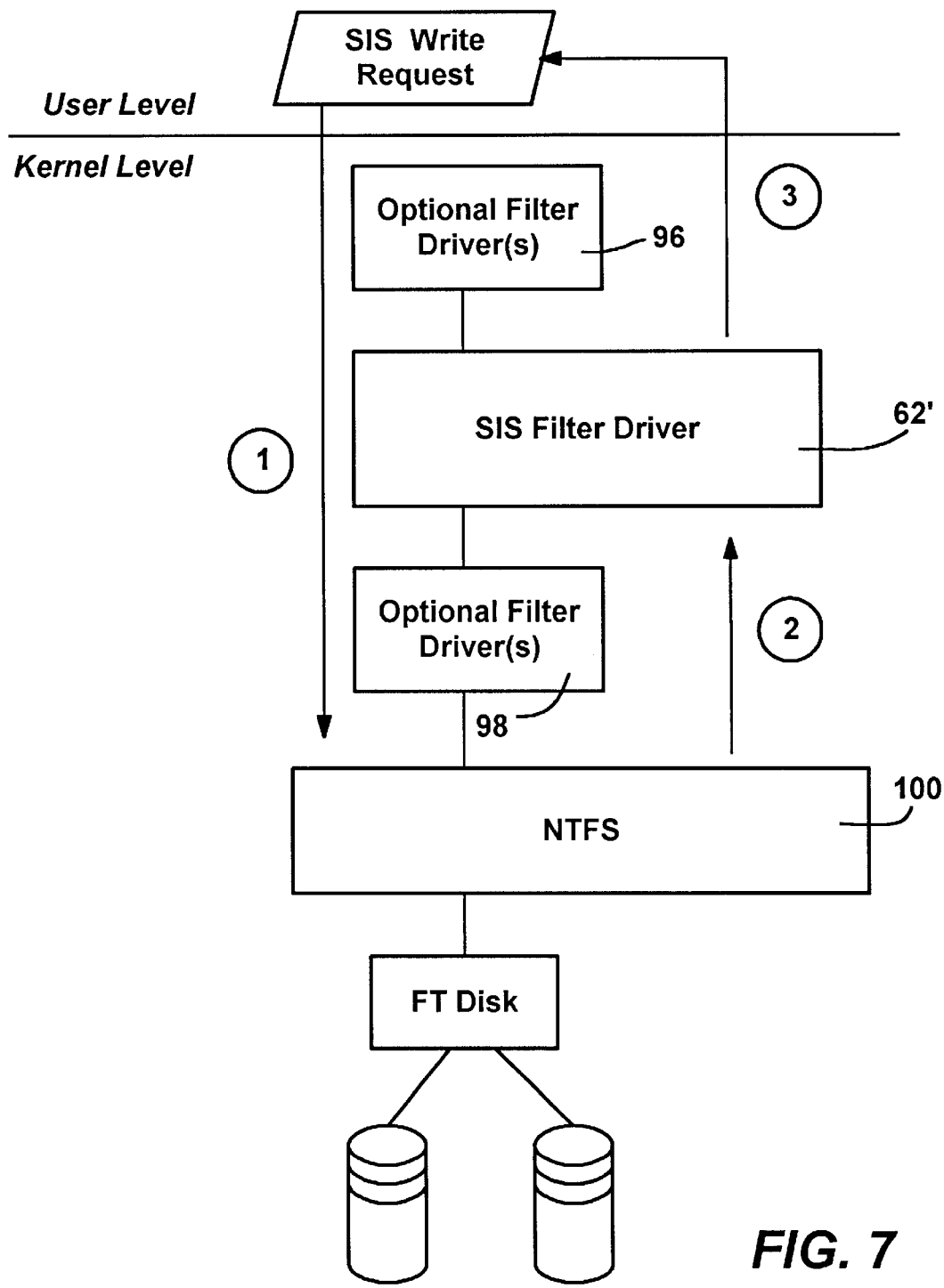
FIG. 7 is a representation of a SIS link file write request passing through a preferred SIS facility
Figure 8:
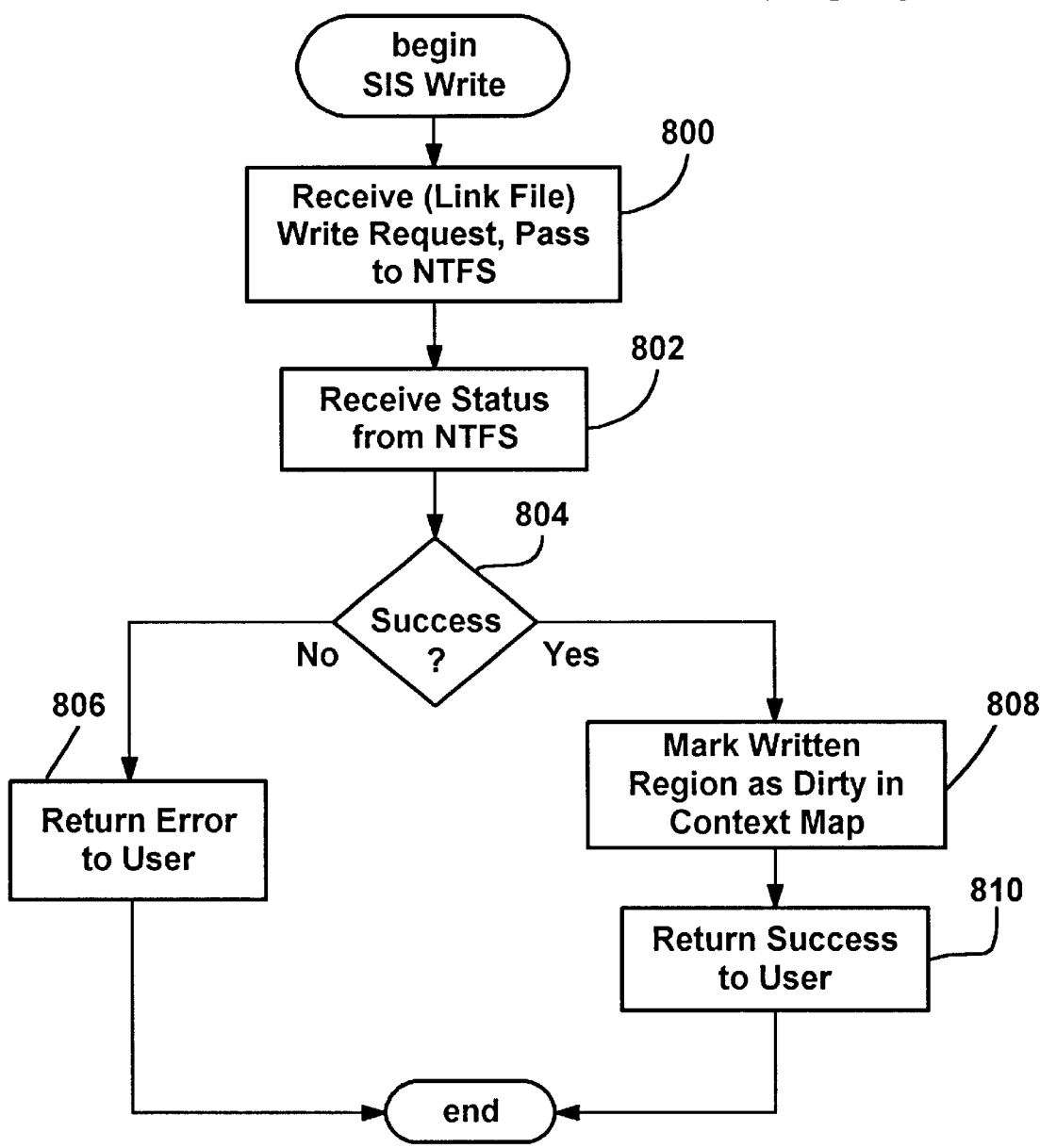
FIG. 8 is a flow diagram generally representing the steps taken by the SIS facility to handle the write request represented in FIG. 7.

FIGS. 7 and 8 describe how the SIS filter 62' handles a write request to the open link file 70. As shown in FIG. 7, the SIS write request comes through the driver stack to the SIS filter driver 62' as an IRP, including the file handle and attached context 102. The IRP designates the region of the file to be written and identifies the location of the data to write. The SIS filter driver 62' can recognize the context 102 as belonging to SIS, but because the write is directed to the link file 70, SIS lets the IRP pass to the NTFS 100 as shown in FIG. 7 by the arrow with circled numeral one and in FIG. 8 as step 800. NTFS attempts the write, allocating appropriate space in the link file 70, and SIS receives a status from the NTFS at step 802 (the arrow with circled numeral two in FIG. 7). If the write failed, e.g., the disk is full and the space could not be allocated, step 804 branches to step 806 where the error is returned to inform the user.

If the write was successful, step 804 branches to step 808 where the SIS filter driver 62' marks the region that was written as dirty in the context map 104 of the context 102, while step 810 then reports the successful write status to the user. In this manner, SIS tracks which part of the file data is current in the common store file 68 and which part is current in the link file 70. By way of example, consider a user requesting to write ten kilobytes of data beginning at offset one megabyte, as generally shown in FIG. 3. The NTFS 100 allocates the space, unless already allocated, in the appropriate region 108 of the link file's (sparse) data space 110 (note that the NTFS actually allocates space in 64-kilobyte blocks). SIS then marks the context map 104 to reflect this dirty region, as shown in FIG. 3. Note that since the changes are not written to the common store file 68, the changes written to one link file are not seen by any other link to the common store file 68.

SIS thus lets NTFS 100 handle the allocation of the space in the sparse file and the writing thereto. However, if SIS is implemented in a file system that did not have sparse file capabilities, SIS could perform the equivalent operation by intercepting the write request and writing the data to a temporary file. Upon closing the "changed" link file, SIS only need copy the clean data from the common store file to the temporary file, delete the link file and rename the temporary file with the name of the link file to achieve the logical separation of files in a transparent manner.

Figure 9:
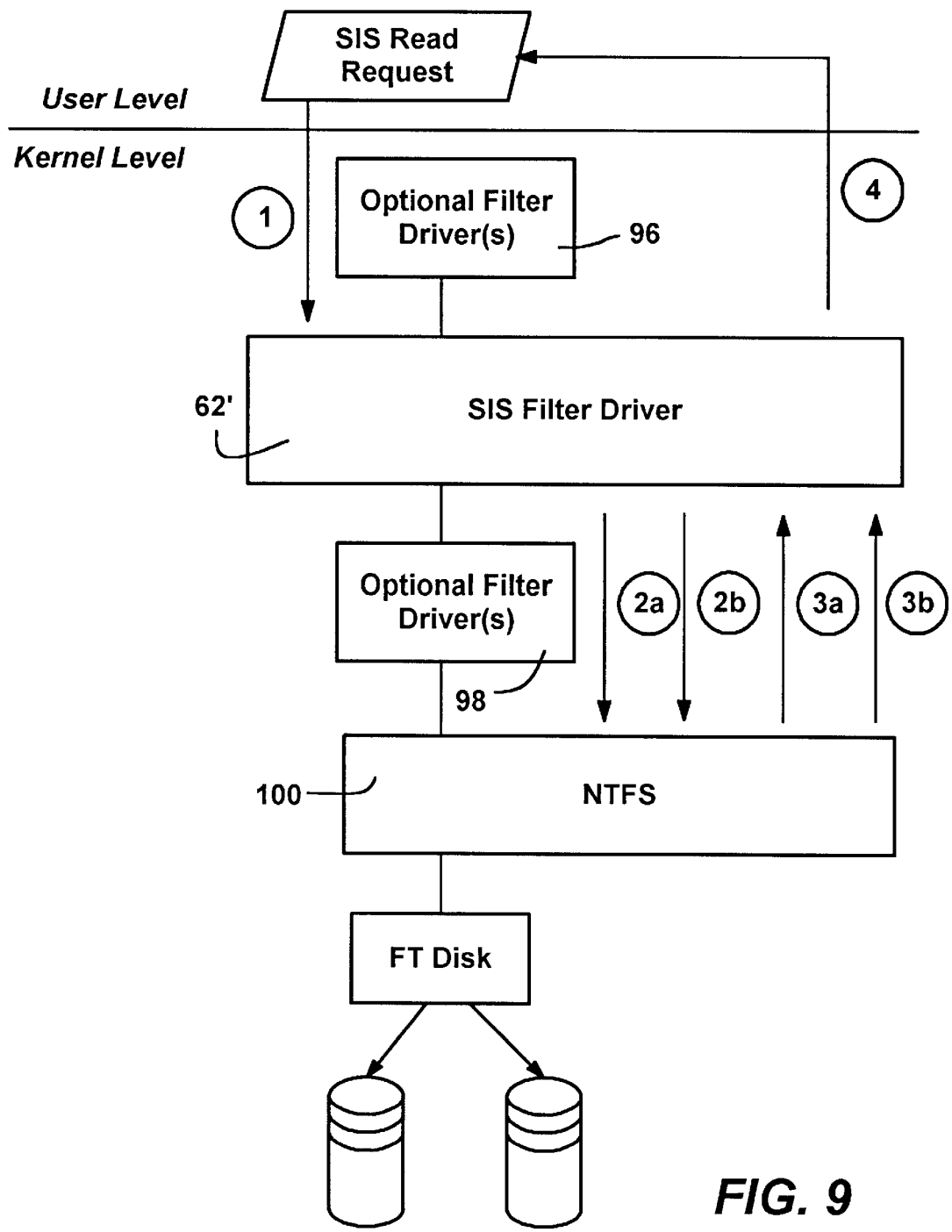
FIG. 9 is a representation of a SIS link file read request passing through a preferred SIS facility.
Figure 10:
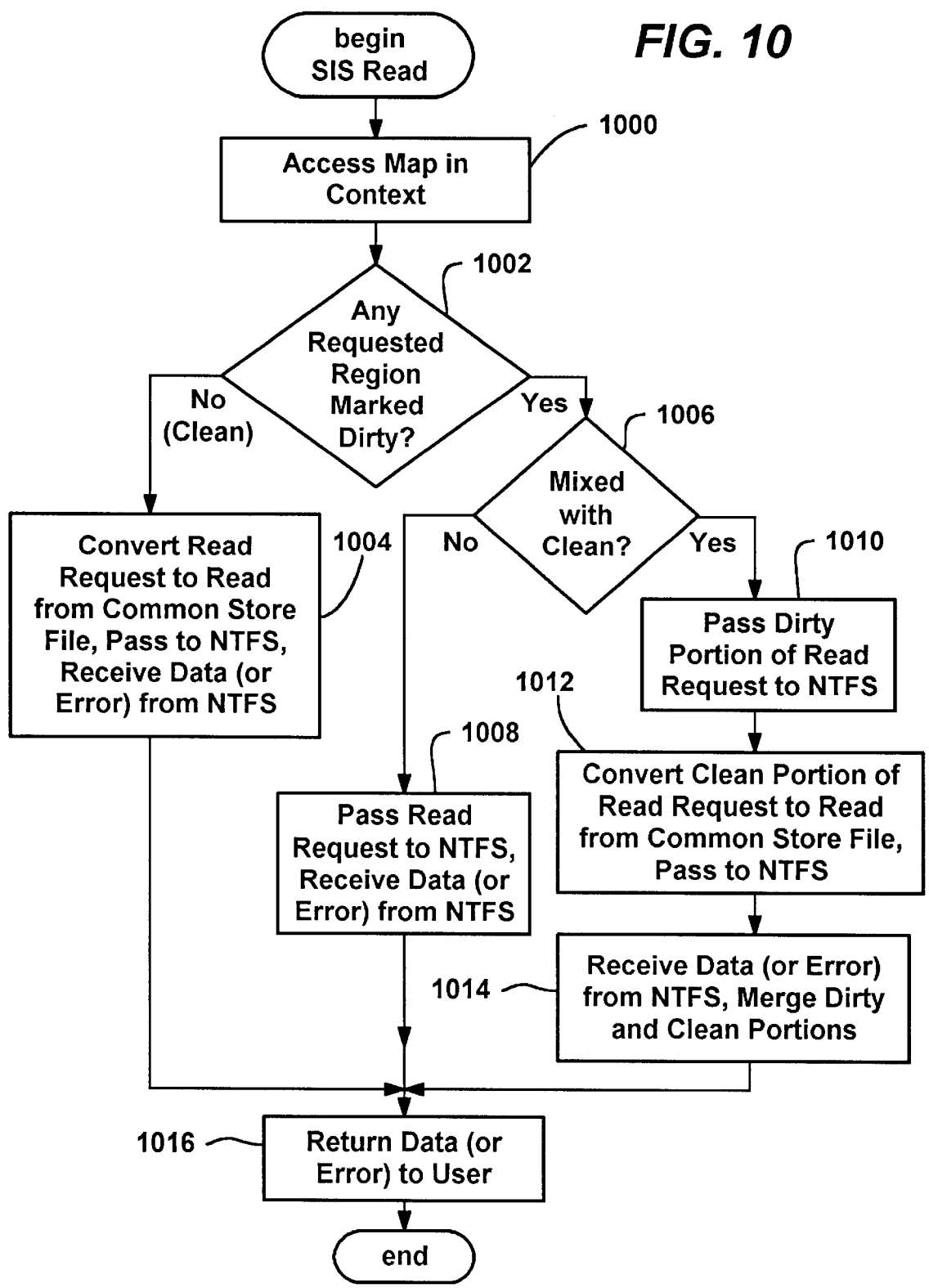
FIG. 10 is a flow diagram generally representing the steps taken by the SIS facility to handle the read request represented in FIG. 9.

FIGS. 9 and 10 describe how the SIS filter 62' handles a read request to the open link file 70. As shown in FIG. 9, the SIS read request comes through the driver stack to the SIS filter driver 62' as an IRP, including the file handle and attached context. The SIS filter driver 62' recognizes the attached context 102 as belonging to SIS, and intercepts the IRP, shown in FIG. 9 by the arrow with circled numeral one.

As shown in step 1000 of FIG. 10, the SIS filter driver initially examines the map 104 in the attached context 102 to determine if any of the link file is marked as dirty, i.e., allocated to file data. Step 1002 then compares the region that the IRP is specifying to read against the map 104, and if the read is to a clean region, step 1002 branches to step 1004. At step 1004, SIS converts the link file read request to a common store file read request IRP and passes the modified IRP to the NTFS 100 as also shown by the arrow accompanied by the circled numeral 2a in FIG. 9. The NTFS 100 responds with the requested data (or an error) as shown in FIG. 9 by the arrow with circled numeral 3a. The data (or error) is then returned to the user at step 1016 of FIG. 10, (circled numeral 4 in FIG. 9). Note that to the user, the request appears to have been satisfied via a read to the link file, when in actuality the SIS filter 62' intercepted the request and converted it to a request to read from the common store file 68.

Returning to step 1002, it is possible that via a write operation to the link file, some of the data requested to be read is from a "dirty" region, that is, one that has been allocated and written to while the link file was open (or that was allocated on the disk when the link was first opened in step 622). As described above, write requests cause space to be allocated in the link file 70 to provide an actual region to maintain the current state of the changed data. At step 1002, if a requested region to read is marked as dirty, step 1002 branches to step 1006 to determine if the entire read is from a dirty region or spans both dirty and clean regions.

If the entire region is dirty, then the SIS filter 62' passes the read request IRP to the NTFS 100 whereby the link file 70 is read at step 1008 and returned to the SIS filter 62'. This is represented in FIG. 9 by the arrows designated with circled numerals 2b and 3b. The data (or error) is then returned to the user at step 1016 of FIG. 10, (circled numeral 4 in FIG. 9). In this manner, the user receives the current changes that have been written to the link file rather than the stale data in the common store file 68.

Alternatively, if step 1006 detects that the user is requesting both clean and dirty regions, the SIS filter 62' splits up the read request into appropriate requests to read the dirty region or regions from the link file 70 and the clean region or regions from the common store file 68. To this end, at steps 1010 and 1012, the SIS filter 62' uses the map 104 to generate one or more IRPs directed to reading the common store file 68 and passes at least one IRP directed to reading the link file 70 and at least one IRP directed to reading the common store file 68 to the NTFS 100. This is represented in FIG. 9 by arrows labeled with circled numerals 2a and 2b. Assuming no read errors, step 1014 merges the read results returned from the NTFS 100 (in FIG. 9, the arrows labeled with circled numerals 3a and 3b) into a single result returned to the user at step 1016 (the arrow labeled with circled numeral 4). Note that any read error will result in an error returned to the user, although of course SIS may first retry on an error. By appropriately returning the current data in response to a read request from either the common store file 68 or the link file 70, or both, SIS maintains the logical separation of the link files in a manner that is transparent to the requesting user.

Figure 11:
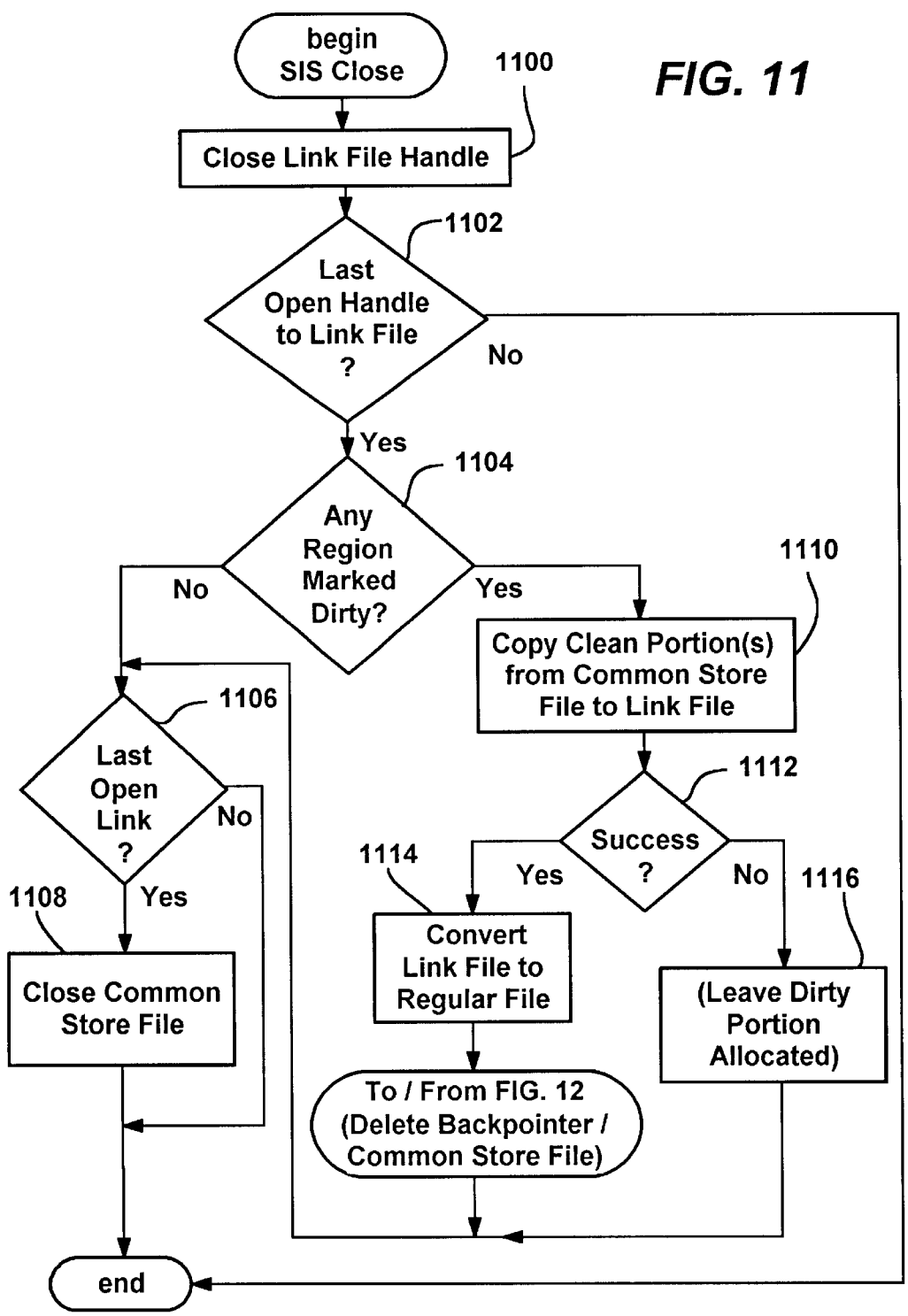
FIG. 11 is a flow diagram generally representing the steps taken by the SIS facility to handle a SIS link file close request.

FIG. 11 represents the steps taken when a request to close the handle to the link file 70 is received and the handle is closed at step 1100. At step 1102, a test is performed to see if this was the last handle currently open to this link file. If not, the process ends, whereby the link file is left open for operations via the other open file handles. If instead this was the last open handle, step 1104 makes a determination (via the context map 104) if any portion of the link file 70 is marked as dirty (allocated). If not, the driver 62' requests closing of the common store file handle, whereby steps 1106 and 1108 cause the common store file 68 to be closed if no other links have the common store file 68 open, otherwise the common store file 68 remains open for the other links to use. Conversely, at step 1104, if any region of the link file 70 was written to and is thus marked as dirty, step 1104 branches to step 1110 since the link file may no longer be properly represented by the common store file 68. Note that steps 1110 and below may take place after the link file handle has been closed, by doing the work in a special system context. This allows the users to access the SIS file while the copyout of clean data is in progress. Step 1110 copies the clean portions from the common store file 68 to space allocated therefor in the link file 70. If successful at step 1112, the now fully-allocated link file is converted back to a regular file 64 at step 1114, essentially by removing the reparse point. In this manner, logically independent links to the common store file are supported, as the changes made to one link file are not seen via any other link file. The link file 70 is then deleted from the list of files in the backpointer stream as described below with reference to FIG. 12, which may further result in the common store file being deleted. The process then continues to steps 1106 and 1108 to close the common store file if no other links have it open. Note that the handle to the common store file needs to be closed even if the common store file was deleted.

However, it is possible that the clean data from the common store file 68 could not be copied back, particularly if the space therefor could not be allocated in the link file 70 due to a disk full condition. If such an error occurs, step 1112 branches to step 1116 which represents the canceling of the copyout and leaving the link file 70 as is, preserving the written data. Note that this will not cause a disk full condition because the space was already allocated to the link file during the earlier write request without an error, otherwise the write request that caused the space to be allocated would have failed and the user notified (FIG. 8, steps 804–806). As described above, when the link file is re-opened, step 622 of FIG. 6B will mark the allocated portions of the link file 70 as dirty in the map 104, whereby the changes are properly returned when the file is read. Step 1116 then continues to steps 1106 and 1108 to close the common store file if no other links have it open.

In a similar manner to the disk full condition, it is thus possible in general to employ the SIS architecture to use the link file 70 to maintain changes (deltas), with the unchanged clean regions backed up by the common store file 68. To this end, instead of copying the clean portions from the common store file and reconverting the link file to a regular file when the file is closed, SIS may keep the link file as a link file with whatever space is allocated thereto. Some criteria also may be used to determine when it is better to convert the link file back to a regular file. For example, a threshold test as to the space saved may be employed to determine when to return a link file to a regular file versus keeping it as a link, whereby only link files with relatively small deltas would be maintained as link files. As a result, SIS may provide space savings with files that are not exact duplicates, particularly if the file contents are almost exactly identical. Notwithstanding, at present SIS preferably employs the copy-on-close technique of FIG. 11, since updates of SIS files and/or writes thereto are likely to be relatively rare.

Figure 12:
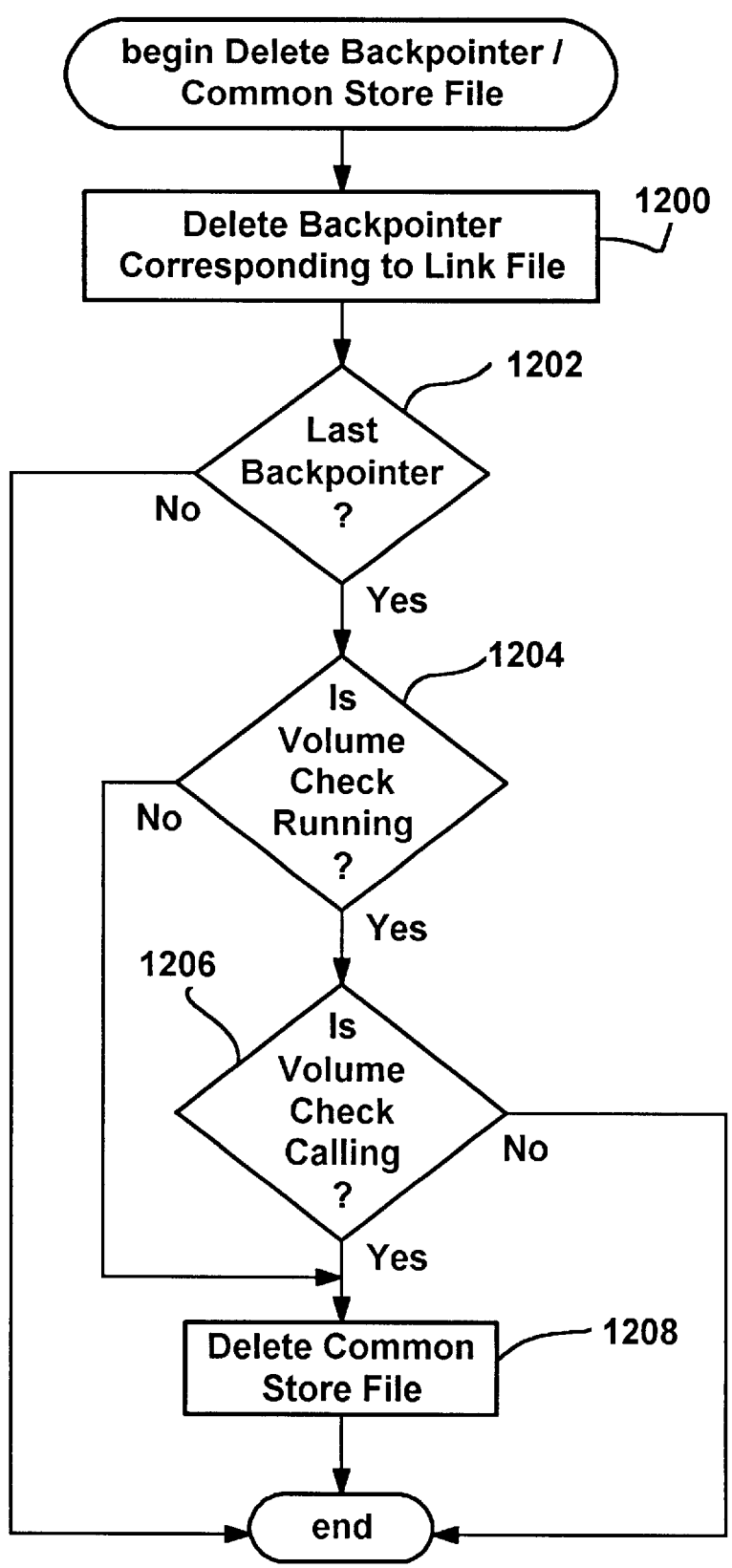
FIG. 12 is a flow diagram generally representing the steps taken by the SIS facility to handle a SIS link file delete request.

Turning to FIG. 12, there is shown a process employed by SIS after a link file is deleted (e.g., by file I/O) or reconverted to a regular file (e.g., by the SIS close process). When a SIS link is deleted or reconverted to a regular file, the common store file 68 corresponding to that SIS link file is not necessarily deleted because other links may be pointing to that common store file 68. Thus, at step 1202, the backpointer stream 94 is evaluated to determine if the deleted backpointer was the last backpointer remaining in the stream, i.e., there are no more backpointers. If it is not the last backpointer, then there is at least one other link file pointing to the common store file 68, the common store file 68 is thus still needed, and the process ends. In this manner, logically independent links to the common store file are again supported, as deleting one link file does not affect any other link file.

If no backpointers remain at step 1202, this generally indicates that no link files are pointing to the common store file and thus the common store file is no longer needed. However, before deleting the common store file, step 1202 branches to step 1204 where a test is performed as to whether the volume check procedure 106 is running. If so, there is a possibility that the backpointer stream is corrupted, as described below. If the volume check is not currently running, step 1204 advances to step 1208 to delete the common store file (after first closing it, if necessary). Otherwise, since the backpointer stream is not necessarily trustworthy, step 1204 branches to step 1206 where it is determined whether the volume check 106 is calling this delete procedure, i.e., whether the steps of FIG. 12 are being invoked from FIG. 13B. If the volume check is not calling to delete the file, step 1206 ends the process without deleting the file, otherwise step 1206 branches to step 1208 to delete the file. Step 1206 thus enables the volume check 106 to delete a common store file when the volume check has concluded that the backpointer stream is correct and no link files point thereto.

In sum, step 1208 deletes the common store file when the backpointer stream is both empty and trusted, thereby reclaiming the disk space. Note that instead of backpointers, counts of the links may be alternatively used for this purpose, i.e., delete the common store file when a count of zero links thereto remain. Backpointers are preferable, however, primarily because they are more robust than counts.

SIS File Backup and Restore

The present invention is directed to the backing up and restoring of SIS files, including SIS links and common store files, in a manner that safely preserves the data without using unnecessary storage space for the files. In general, this is accomplished via a backup process of the present invention by backing up the link files and only one copy of the common store file that corresponds to each set of one or more backed-up link files pointing to that common store file. Then, upon restore, the restore process of the present invention restores the link files and ensures that one (but only one) copy of the common store file is in the common store 78. Note that for purposes of simplicity herein, the present invention will be primarily described with reference to one common store file per link, however in an alternative embodiment, a single link may be backed by multiple common store files, (e.g., one for each stream in the file). The backup and restore operations of the present invention are preferably implemented via a SIS interface in the form of a dynamic link library (DLL) 116, in combination with backup and restore application programs 118, 120 (FIG. 2B).

In order to back up and restore SIS links, the backup application program 118 needs to be able to tell which files are links to which common store files, and store both the link and the common store file on a backup storage medium 122, such as a tape. In keeping with the invention, if there is more than one link to a given common store file backed up on the backup storage medium 122, there is no need to put more than one copy of the common store file on the backup storage medium 122. Similarly, when restoring a SIS link, the restore application program 120 needs to determine to which common store file the link refers. If that file does not already exist in the common store, and has not already been identified to the restore application 120 via a previous link, the restore application program 120 needs to restore the file along with the link. If the link refers to a common store file that is already present on the disk volume or has already been identified to the restore application 120, then only the link needs to be restored. As described above, a common store file is unique and the data therein does not change, and thus if a given common store file is still on the disk at restore time, it has the same contents as when it was backed up and there is no need to overwrite it with itself.

As shown in FIGS. 2A–2B, SIS provides a DLL 116 (e.g., sisbkup.dll) whereby the backup and restore application programs 118, 120 may handle the backup and restore operations in accordance with the present invention, without having to understand the contents of SIS reparse points. Instead, when a link is detected, the backup and restore applications 118, 120 make straightforward calls to an application programming interface (API) of the DLL 116, which identifies one or more common store files as necessary. Note that the API does not make any assumptions about how the backup program 118 stores the necessary information about SIS links, or how it stores the content of the common store file or files backing the links, but rather the API operates under the premise that the backup application 118 will correctly back up a set of common store files as identified by the SIS DLL 116, and that these common store files will be available when the restore application 120 is run. Moreover, the backup and/or restore applications 118, 120 and DLL 116 may be arranged to handle multiple link files in a single function call, whereby one or more common store files may be identified in response to the call. However, for purposes of simplicity in the following description, only one link file will be provided per call to the DLL 116.

Although not necessary to the present invention, one advantage to using an API is that the contents of the SIS reparse points are opaque to the backup and restore applications 118, 120. This allows the format of the SIS reparse points to change over time, while changing only the DLL 116 and not the backup or restore applications 118, 120. To this end, the reparse points preferably include a format version identifier, whereby the DLL 116 and SIS driver 62' may handle downlevel reparse points.

The following sets forth the API calls to the DLL 116 that the backup application 118 makes in order to back up SIS files:

```
SisCreateBackupStructure
BOOL SisCreateBackupStructure(
        IN PWCHAR      volumeRoot,
        OUT PVOID      *sisBackupStructure,
        OUT PWCHAR     *commonStoreRootPathname,
        OUT PULONG     countOfCommonStoreFilesToBackUp,
        OUT PWCHAR     **commonStoreFilesToBackUp);
```

The SisCreateBackupStructure call creates a SIS backup structure, which is used by the SIS DLL 116 to keep track of which files are links to which other files on the volume 80. This function should be called once for each SIS-enabled volume being backed up. Note that the SIS backup/restore operations are volume-local, i.e., if for some reason the backup application 118 should need to cross volumes during a backup, the backup application 118 will need to call SisCreateBackupStructure for each different volume being backed up, and will need to provide the appropriate Sis-BackupStructure corresponding to the volume for the file in question in all subsequent calls. Similar requirements apply to restore.

The volumeRoot parameter is the Win32 file name of the volume root (without the trailing backslash, e.g., use "c:" not "c:\") for the volume being backed up. The commonStore-RootPathname output parameter returns the fully qualified pathname of the common store for this volume (e.g., "c:\SIS Common Store"). Any files anywhere under this directory should be treated as common store files for this volume, and only backed up if SIS indicates that they should be. The countOfCommonStoreFilesToBackUp and commonStore-FilesToBackUp parameters together return from the DLL 116 a list of any files that SIS deems necessary to back up, regardless of which links are backed up. The commonStore-FilesToBackUp parameter is a pointer to an array of filenames. These files should be backed up at the same time and in the same manner as any common store files requested by SisCSFilesToBackUpForLink, described below. If countOf-CommonStoreFilesToBackUp is zero, then commonStore-FilesToBackUp may be a NULL pointer and should be ignored by the backup application 118.

The return value is TRUE if the call succeeded, and FALSE otherwise. If FALSE, the application may call "GetLastError" to find out why the call failed. After the backup application 118 is done with the (non-NULL) commonStoreFilesToBackUp array, the backup application 118 should free the array and the strings to which it points by calling the SisFreeAllocatedMemory function for each individual file name and then also for the array of filenames.

```
SisCSFilesToBackUpForLink
BOOL SisCSFilesToBackUpForLink(
        IN PVOID        sisBackupStructure,
        IN PVOID        reparseData,
        IN ULONG        reparseDataSize,
        IN PVOID        thisFileContext         OPTIONAL,
        OUT PVOID       *matchingFileContext    OPTIONAL,
        OUT PULONG      countOfCommonStoreFilesToBackUp,
        OUT PWCHAR      **commonStoreFilesToBackUp);
```

The backup application 118 identifies SIS links by the SIS reparse point in its tag, IO_REPARSE_TAG_SIS. For each SIS link to be backed up, the backup application 118 should call (only once per link file) SisCSFilesToBackUpForLink.

The SisCSFilesToBackUpForLink function takes as input a pointer to the contents of the SIS reparse point for a link file that the backup application 118 is planning to store on the backup storage medium 122. This function also takes the length of the reparse data as a parameter, as well as an optional context pointer that is provided by the backup application and uninterpreted by the SIS DLL 116.

In accordance with one aspect of the present invention, if this reparse point represents the first instance of the particular file being backed up, SIS will return NULL as the matching file context, fill in the countOfCommonStoreFilesToBackUp count (e.g., with a value of one), fill in the commonStoreFilesToBackUp array with a string comprising the name of the common store file to include on the backup storage medium, and provide a pointer to the array. At present, SIS returns at most one common store file, but it is possible that in future versions a single link may be backed by an entire set of common store files, (e.g., one for each stream in the file), whereby SIS will return an appropriate countOfCommonStoreFilesToBackUp count and multiple strings in the commonStoreFilesToBackUp array. Regardless, each common store file will be returned at most once per backup pass.

If this is not the first instance of the given common store file being backed up, SIS will fill in the matchingFileContext with the thisFileContext that was passed in for the first instance of the file, and will set the countOfCommonStoreFilesToBackUp to zero. If there are multiple common store matches for this link, the thisFileContext will correspond to the earliest match with the first common store file returned in the array (i.e., commonStoreFilesToBackUp[0]. The thisFileContext and matchingFileContext parameters are optional, and if they are supplied as NULL, they will be ignored by the DLL 116.

When SisCSFilesToBackUpForLink says there is a common store file (or more than one common store file) to back up for the link, the backup application 118 should write out the common store file (or files) indicated by the returned filenames to the backup storage medium 122. Regardless of whether there is a common store file, the backup application 118 should back up the link file as it actually appears on the disk, i.e., as a reparse point and a sparse file, most likely with no regions filled in. The backup application 118 may write out the common store files immediately, postpone backing them up, or mix them together, as deemed convenient.

The return value is TRUE if the call succeeded, and FALSE otherwise. If FALSE, the application may call "GetLastError" to find out why the call failed. When the backup application 118 is done with the array of filenames and the filenames themselves, it needs to return them to SIS to be freed by calling the SisFreeAllocatedMemory function.

```
SisFreeBackupStructure
        BOOL SisFreeBackupStructure(
                IN PVOID  sisBackupStructure);
```

This call deallocates a SIS volume structure and should be called after backup is done with a particular volume. Note that SIS may take action other than simply deallocating memory in response to this call, so the SisFreeBackupStructure function should be called even if the backup application program 118 intends to exit immediately afterward. The return value is TRUE if the call succeeded, and FALSE otherwise. If FALSE, the application may call "GetLastError" to find out why the call failed.

The following API functions are directed to restoring SIS files:

```
SisCreateRestoreStructure
BOOL SisCreateRestoreStructure(
        IN PWCHAR       volumeRoot
        OUT PVOID       *sisRestoreStructure,
        OUT PWCHAR      *commonStoreRootPathname,
        OUT PULONG      countOfCommonStoreFilesToRestore
        OUT PWCHAR      **commonStoreFilesToRestore);
```

This function is analogous to SisCreateBackupStructure, and has essentially the same parameters, described above with respect to SisCreateBackupStructure. The calling application is responsible for freeing the returned file names by calling SisFreeAllocatedMemory.

As a restore proceeds, when the restore application program 120 wishes to restore a SIS link (which the restore application 120 identifies by the reparse tag, "IO_REPARSE_TAG_SIS"), the restore application program 120 should restore the link from the backup storage medium just as it was backed up, i.e., as a sparse, possibly-empty file with a SIS reparse point, and then call into the DLL 116 to see if it needs to also restore a common store file (or files) as a result of restoring the link.

Note that the DLL 116 will not necessarily report common store files for a set of links on the backup storage medium if the common store files to which the particular links refer still exist on the disk. This is because the contents of the data streams of common store files never change once created, so if the file already exists on the disk, there is no need to restore it. As described above, common store file names are globally unique, whereby even if a restore application program 120 is run on a different SIS-enabled volume from the backed-up volume, bypassing the restoration of the common store file when already present in the common store should work properly.

```
SisRestoredLink
        BOOL SisRestoredLink(
                IN PVOID        sisRestoreStruture,
```

```
                IN PWCHAR     restoredFileName,
                IN PVOID      reparseData,
                IN ULONG      reparseDataSize,
                OUT PULONG    countOfCommonStoreFilesToRestore,
                OUT PWCHAR    **commonStoreFilesToRestore);
```

The restore application program 120 should call the SisRestoredLink function for each SIS link that it has restored, passing in the fully qualified filename, reparse buffer and length of the reparse data that was stored for the SIS reparse point on the backup storage medium. Note that if a link file is restored onto a volume that does not support SIS, the SisRestoredLinkFile function will fail, and GetLastError will return ERROR_VOLUME_NOT_SIS_ENABLED. In this manner, the restore application does not need to be able to determine on its own whether SIS is turned on for a particular volume. If the call is successful, the countOfCommonStoreFilesToRestore value and the commonStoreFilesToRestore array reports the common store file name (or file names) returned. If the value of countOfCommonStoreFilesToRestore is non-zero, commonStoreFilesToRestore will represent those common store files that need to be restored as a result of restoring the link. If it is zero, then either the corresponding common store files have already been returned once to the restore application program 120, or are already present on the volume 80.

Thus, in accordance with one aspect of the present invention, the SisRestoredLink function will return each common store file once per restore, and subsequent links that refer to the same common store file will not return that file name. The SisRestoredLink will not return a common store file that was not also returned in a SisCSFilesToBackUpForLink call during backup, (presuming that the reparse data has not been corrupted on the backup storage medium). The return value is TRUE if the call succeeded, and FALSE otherwise. If FALSE, the restore application 120 may call "GetLastError" to find out why the call failed.

When the restore application program 120 restores a link file, it should create the appropriate sparse file, write in any allocated regions (if there are any), and then set the reparse data on the file just as it was read during backup. To properly restore a SIS link, the restore application program 120 should create sparse files with unallocated regions rather than sparse files (or non-sparse files) filled in with zeroes.

After the restore application program 120 has restored a common store file, the restore application program 120 should call the following function:

```
        SisRestoredCommonStoreFile
        NTSTATUS SisRestoredCommonStoreFile(
                        IN PVOID      sisRestoreStructure,
                        IN PWCHAR     commonStoreFileName);
```

This function informs SIS that a new common store file has been written, thereby allowing SIS to take any action needed to initialize its internal data structures, fix up the links to the file, and so on. The restore application program 120 should only restore common store files that were returned as a result of calling SisRestoredLink, even if there are more common store files on the backup storage medium 122.

The restore application program 120 is free to restore the link and common store files in any order it wants, but in order to work properly, needs to call SisRestoredLink after restoring any link, and also call SisRestoredCommonStoreFile after it restores any common store file. The restore application program 120 should not overwrite any common store files that are not returned from SisRestoreLink. Since the restore application program 120 does not know the common store files to restore until they are reported to it as a result of restoring a link, the restore application program 120 will always restore a common store file after at least one link referring to the common store file is restored. However, the restore application program 120 is then free to restore more links that point at the same common store file.

The return value is TRUE if the call succeeded, and FALSE otherwise. If FALSE, the application 120 may call "GetLastError" to find out why the call failed.

```
        SisFreeRestoreStructure
                  BOOL SisFreeRestoreStructure(
                          IN PVOID   sisRestoreStructure);
```

This function deletes the sisRestoreStructure and does work to cause the SIS filter 62' to properly set up the links created during the restore. Accessing the links before this call completes can result in a volume check and/or reading contents of the link. SIS may elect to do more in response to this call than merely tear down the SIS DLL's data structures 124, and thus the restoration should not be considered complete until the sisRestoreStructure call is finished.

The return value is TRUE if the call succeeded, and FALSE otherwise. If FALSE, the application may call "GetLastError" to find out why the call failed.

```
        SisFreeAllocateMemory
                  VOID SisFreeAllocateMemory(
                          IN PVOID   allocatedSpace)
```

This function frees space allocated by the DLL 116. It takes as input pointer to some memory allocated by the DLL 116, and frees that memory. After the call completes, the caller may no longer access the freed memory. This call should be used for the commonStoreRootPathname strings returned from SisCreateBackupStructure and SisCreateRestoreStructure. It should also be used on the strings in the arrays of common store files returned from SisCreateBackupStructure, SisCSFilesToBackupForLink, SisCreateRestoreStructure, and SisRestoredLink. For these functions, the array itself should be freed by calling SisFreeAllocatedMemory.

Figure 13A:
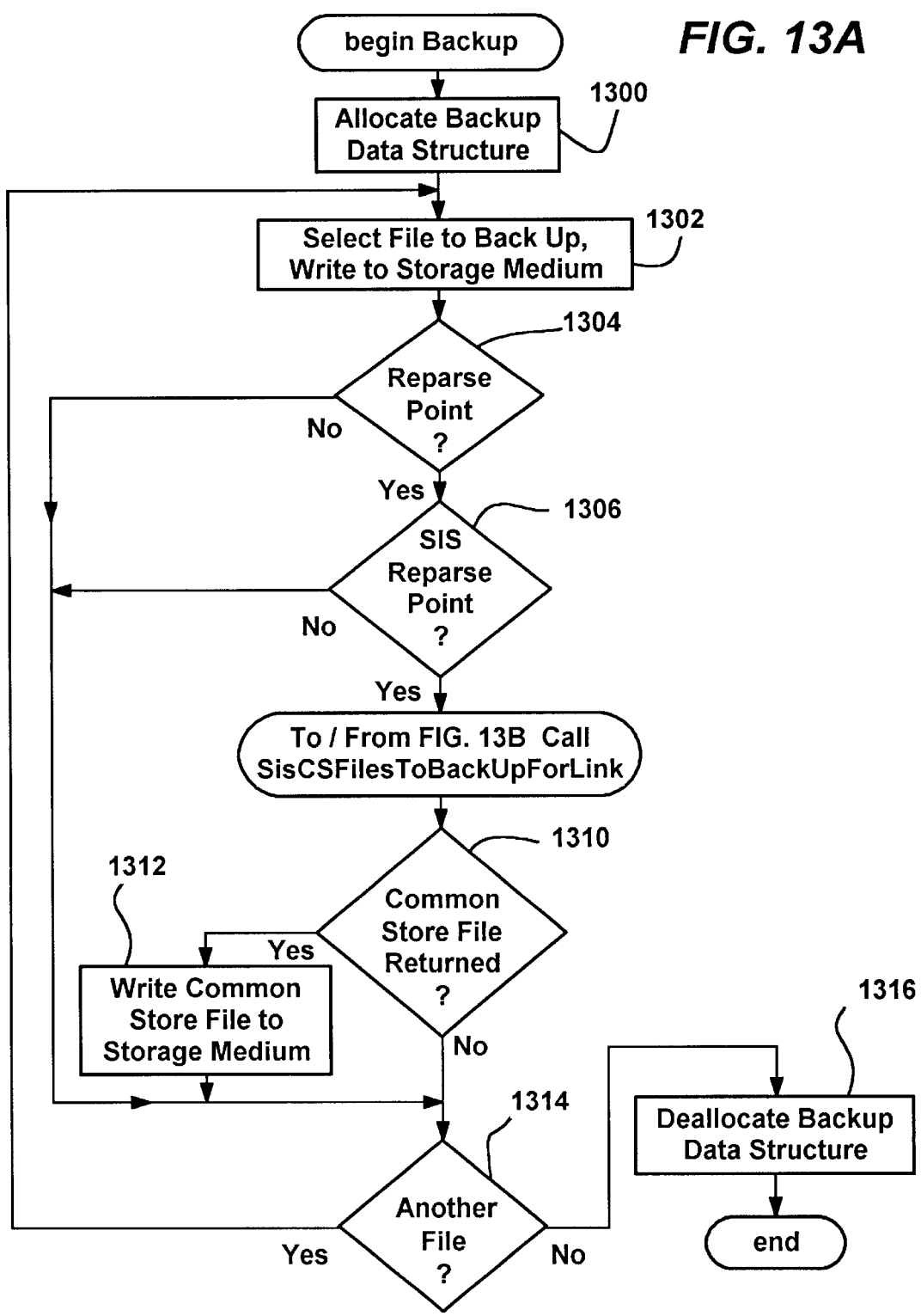
FIGS. 13A and 13B comprise a flow diagram generally representing the steps taken to back up SIS files in accordance with an aspect of the present invention.
Figure 13B:
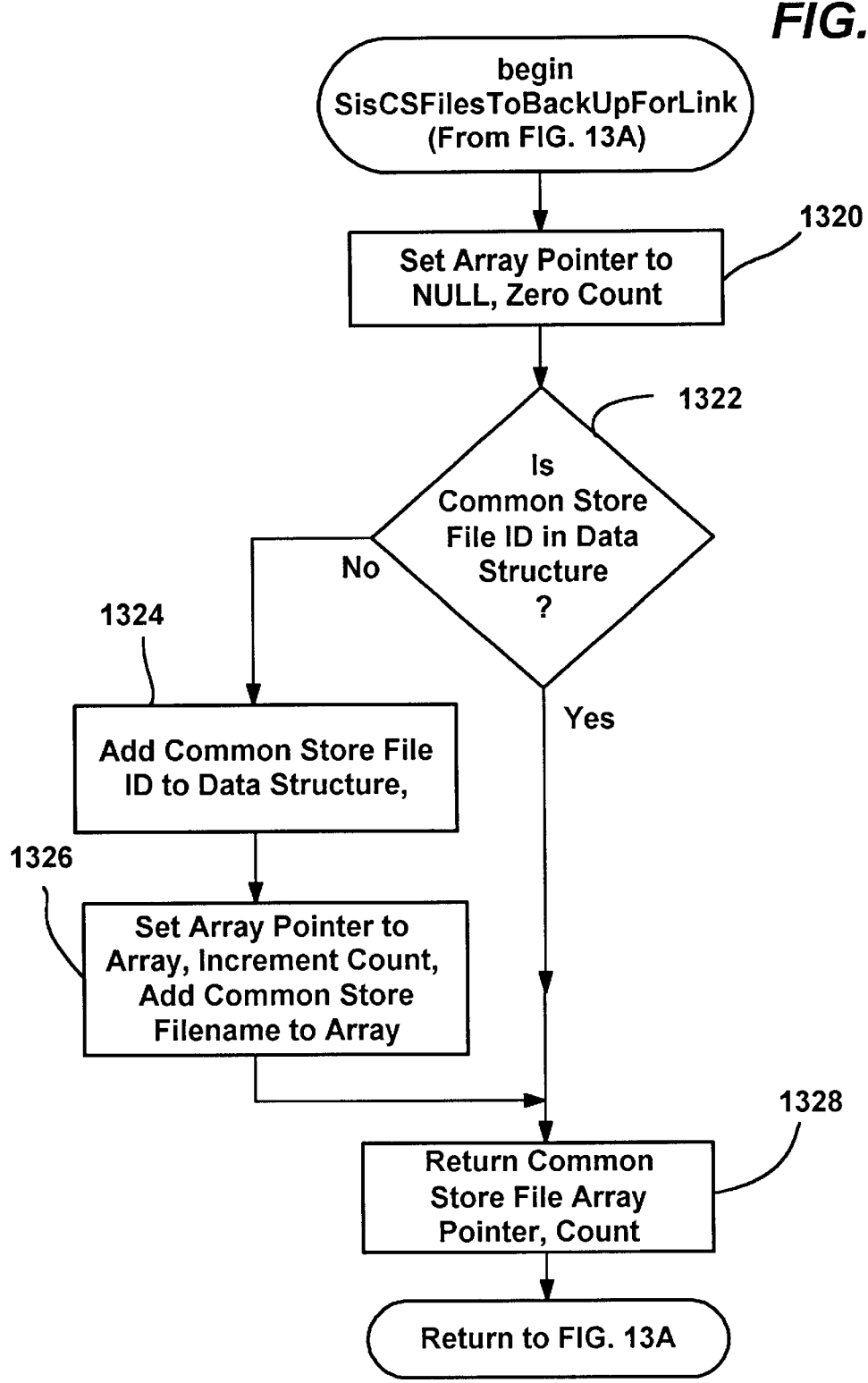

Turning now to an explanation of the operation of the present invention, FIGS. 13A and 13B show the general steps taken to perform a SIS backup. Although the steps generally follow the above-described operations of the backup and restore applications 118, 120 and the functions of the DLL 116, it can be readily appreciated that the steps may be performed in alternative ways. For example, the backup application may defer requesting the creation of the SIS backup structure until at least one SIS link is detected. Thus, the following description is only an example of one way in which backup and restore applications 118, 120 may utilize the DLL 116 to properly back up SIS files.

At step 1300, the backup application 118 begins the file backup by calling the DLL 116 to allocate the backup data structure via the above-described SisCreateBackupStructure call. Next, at step 1302, the backup application 118 selects a file, typically from a hierarchically organized set of files specified by a user, and backs up the file by writing the file to the backup storage medium 122. Note that the write operation need not take place at this time, as the backup program may, for example, collect a number of files to back up (e.g., for compression or other efficiency purposes) before writing out the file information, however for purposes of the present example, the write operation may take place at this time.

At step 1304, the backup program examines the file metadata and determines whether the file is a SIS link file based on whether the file has a reparse point attached thereto (step 1304), and if so, whether the reparse point includes a SIS tag (step 1306). If not a SIS link file, the backup application branches ahead to step 1314, where another file is selected and the process repeated until all specified files have been backed up. If steps 1304 and 1306 determine that the file is a SIS link file, the backup program calls the SisCSFilesToBackUpForLink function as described above, passing the link file information to the DLL 116.

Steps 1320–1328 of FIG. 13B represent the general logic of the SisCSFilesToBackUpForLink function. In general, each time the function returns a common store file for a volume backup, an identifier of the common store file (e.g., its filename or UUID) is added by the DLL 116 to a data structure 124. In keeping with the present invention, the common store filename is only returned to the backup application program 118 if it is not listed in the data structure 124, thus ensuring that the backup program 118 is instructed to back up only one copy of each common store file, regardless of how many backed-up links ultimately point to that common store file. Step 1320 of FIG. 13B first zeros the count of files to return and sets the array pointer to NULL, whereby the backup application 118 will not receive a common store filename unless needed. To this end, step 1322 examines the data structure 124 to determine whether the common store file has already once been returned to the backup application 118. If already returned, step 1322 branches ahead to step 1328 wherein as described above, the SisCSFilesToBackUpForLink function returns a zero count and NULL pointer, respectively, in the countOfCommonStoreFilesToBackUp and commonStoreFilesToBackUp parameters. Otherwise, at step 1324, the SisCSFilesToBackUpForLink function adds the common store file identifier to its data structure 124, thereby tracking its returned status, and adds its filename string to the array for returning to the backup application. At step 1326 the countOfCommonStoreFilesToBackUp and commonStoreFilesToBackUp are appropriately adjusted, after which step 1328 returns the array (i.e., its pointer) and count to the backup application 118. Note that multiple common store files corresponding to a link file may be handled by repeating steps 1322–1326 for each common store file corresponding to the link file, and accumulating the common store files to return in the array before returning the common store file information at step 1328.

Returning to step 1310 of FIG. 13A, if at least one common store file has been returned, each returned common store file is backed up as represented by step 1312. Note that as described above, the backup application 118 can write out the file when convenient for its purposes, not necessarily as soon as returned, however for purposes of the present example, step 1312 shows the write taking place whenever at least one common store file is present in the array.

Step 1314 repeats the process for the set of files to be backed up. When no files remain to be backed up, step 1314 branches to step 1316 where the SisFreeBackupStructure function is called as described above, to deallocate the backup data structure and allow SIS to perform any other desired actions. Once the SisFreeBackupStructure successfully returns, (and assuming no earlier errors), the backup is complete.

The restore operations described in FIGS. 14A–14B generally mirror the backup operations, with a few exceptions as described below. At step 1400, the restore application 120 begins the restoration of files by calling the DLL 116 to allocate the restore data structure via the above-described SisCreateRestoreStructure call. Next, at step 1402, the restore application 120 selects a file, (e.g., from the set of files that were backed up), and restores the file to the volume by reading the file from the backup storage medium 122 and writing it to the local volume. Note that the write operation need not take place at this time, particularly in that as described above, the restore application 120 may first take particular steps to write out any link files as sparse files with possibly allocated regions. Thus, the restore application may first determine if the files are SIS link files, such as via steps 1404 and 1406, (described below), before writing the file. In any event, steps 1404 and 1406 determine if the restored file is a SIS link file, and if so, call the SisRestoredLink function. Otherwise, the restore application 120 branches ahead to select another file (step 1414) and repeat the process until the restoration of the set of files is complete.

Figure 14A:
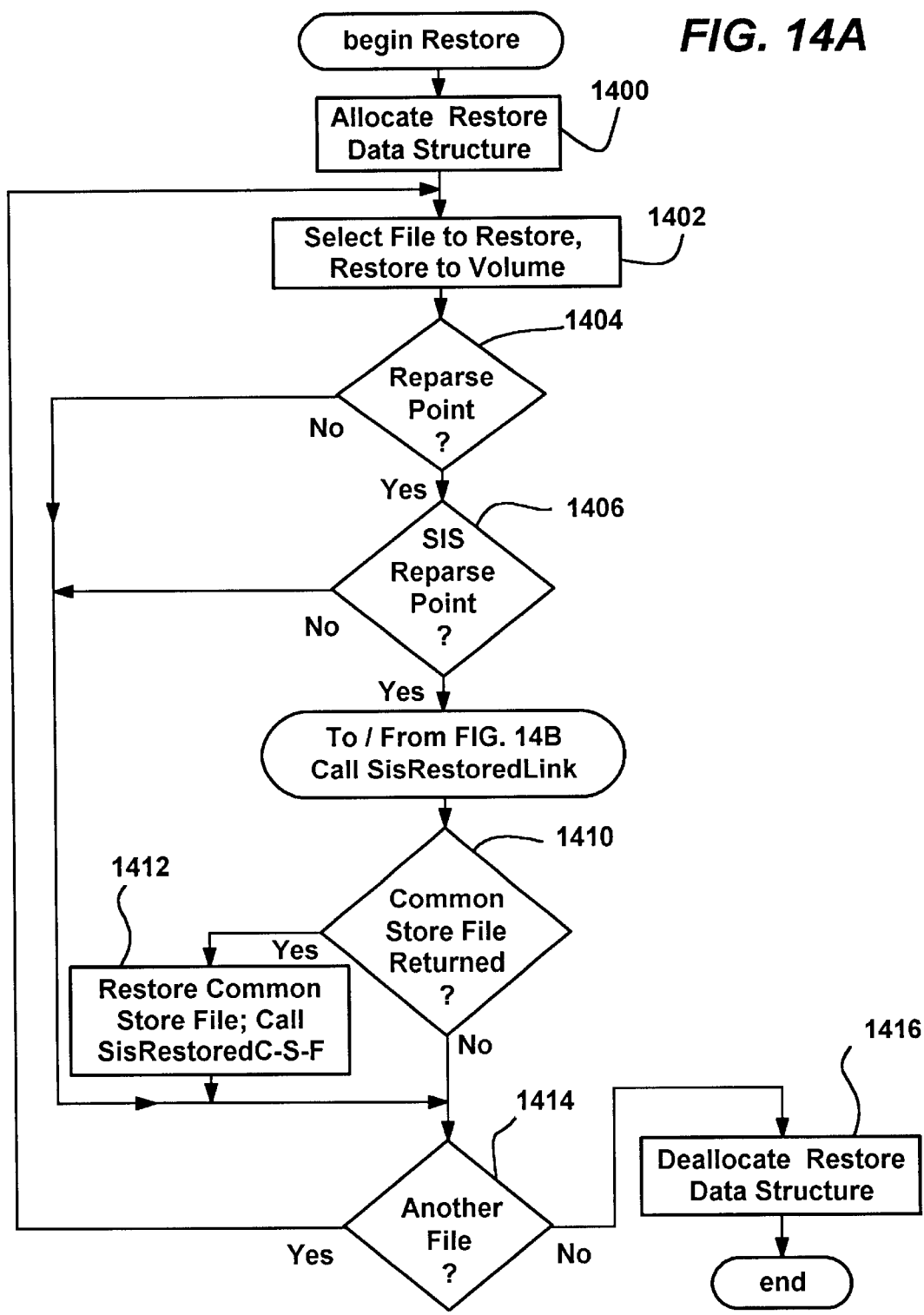
FIGS. 14A and 14B comprise a flow diagram generally representing the steps taken to restore SIS files in accordance with an aspect of the present invention.
Figure 14B:
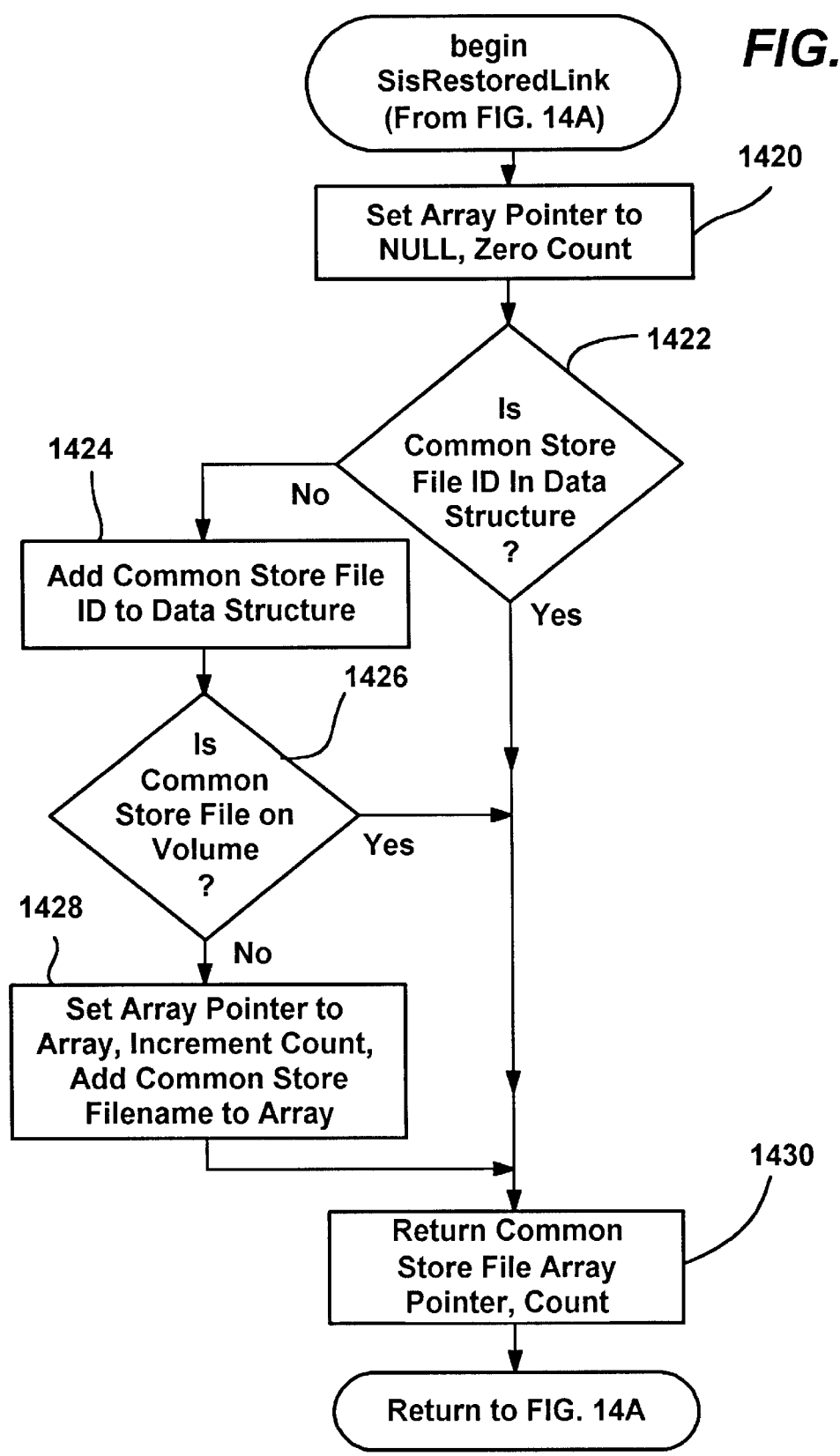

If the selected file is a SIS link file, step 1406 branches to call the SIS link 116, wherein step 1420 of FIG. 14B first zeros the count of files to return and sets the array pointer to NULL, whereby the restore application 120 will not receive a common store filename unless needed. Step 1422 tests whether the common store file corresponding to that link file has previously been returned to the restore application, or is known to be present on the volume, as described below. A data structure 124 is used by the DLL 116 to track the returned/already present files. In keeping with the invention, if the common store file is identified in the data structure 124, via step 1422, the restore application 120 will not be again instructed to restore the common store file.

At step 1424, if not identified in the data structure 124, the common store file identifier is added to the data structure 124 to track its future "not-needed-for-restore" status for link files that will possibly reference the same common store file in the future. Before returning the common store filename, however, there is a possibility that the common store file is otherwise already present on the volume, e.g., it was never deleted since the backup took place. Since common store files are unique (as identified by their UUID) and unchanging, if present on the volume there is no need to overwrite it with an identical file copy. Thus, step 1426 tests to see if the common store file is already present on the volume, and if so, exits (returns a NULL pointer and a zero count) without returning the filename thereof to the restore application program 120. Note that if present on the volume, the common store file identifier will have been added to the data structure 124 at step 1424, whereby for future link files pointing to that common store file, only the data structure 124 and not the volume will need to be checked.

In the event that the common store file has neither been previously returned nor is present on the volume, step 1428 sets the commonStoreFilesToRestore to point to the array, increments the countOfCommonStoreFilesToRestore value, and adds the name of the common store file to the array. Step 1430 then returns the filename via the array, along with the count. Note that if multiple common store files need to be returned for a single link, the steps 1422–1428 may be repeated until the array and count properly reflect those common store files that correspond to the link file, but which have neither been previously returned to the restore application program 120 nor are already present on the volume.

Returning to step 1410 of FIG. 14A, if at least one common store file has been returned, each returned common store file is restored as represented by step 1412. Note that as described above, the restore application 120 can restore the file when convenient for its purposes, not necessarily as soon as returned. For example, restore applications often do not select the order in which they restore files, because if the application is reading from a tape, it is not efficient unless read in order. As a result, the backup application will often postpone writing common store files until the end of the tape, while the restore program will build up the list of common store files to be restored as it runs through the normal files on the tape, and then restore the common store files only when the restore application gets past all of the normal files and to the common store file part of the tape. In any event, for purposes of the present example, step 1412 shows the restore taking place whenever at least one common store file is returned. Also, as shown in step 1412 and as described above, the SisRestoredCommonStoreFile function is called after the common store file has been written, to allow SIS to take action as desired.

Step 1414 repeats the process for the set of files to be backed up. When no files remain to be backed up, step 1414 branches to step 1416 where the SisFreeRestoreStructure function is called by the restore application 120 as described above, to deallocate the backup data structure and allow SIS to perform any other desired actions. Once the SisFreeRestoreStructure successfully returns, (assuming no previous errors), the restoration is complete.

As can be seen from the foregoing detailed description, there is provided a method and system that provide for the backing up and restoring of single instance store files. The method and system operate in a manner that is efficient, and perform backups and restores while essentially maintaining the original storage space requirements of a set of files.

While the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer system, a method comprising:
    receiving information corresponding to a request to back up a link file from a source to a backup medium, the link file comprising a logically distinct file system file that provides access to common file data maintained in a corresponding common store file;
    determining in response to the request whether the common store file corresponding to the link file is already identified for backup as a result of a backup request related to another link file, and:
        a) if not already identified for backup, identifying the link file and the common store file for backup; or
        b) if already identified for backup, identifying the link file but not the common store file for backup such that the common store file data will not be backed up more than once when a plurality of link files of which backup is requested correspond to the common store file.

2. The method of claim 1 wherein receiving information corresponding to a request to back up a link file comprises receiving a function call from a backup application program.

3. The method of claim 1 wherein determining whether the common store file is already identified for backup comprises accessing a data structure for information identifying the common store file.

4. The method of claim 3 further comprising adding information that identifies the common store file to the data structure.

5. The method of claim 1 wherein identifying the common store file to back up comprises returning a file name to a backup application program.

6. The method of claim 5 wherein returning a file name to a backup application program includes writing the filename into an array.

7. The method of claim 1 wherein receiving information corresponding to a link file comprises determining whether a file to be backed up is a link file, and if so, calling a function with information corresponding to the link file.

8. The method of claim 1 further comprising backing up the link file and the common store file.

9. The method of claim 8 further comprising restoring the link file and the common store file.

10. In a computer system, a method comprising:
    receiving information corresponding to request to restore a link file from a backup medium, the link file the link file comprising a logically distinct file system file that provides access to common file data maintained in a corresponding common store file;
    determining in response to the request whether the common store file needs to be identified for restore or is already identified for as a result of a restore request related to another link file, and:
        a) if needed to be identified for restore, identifying the common store file and the link file for restore; or
        b) if not needed to be identified for restore, identifying the link file but not the common store file for restore such that the common store file data will not be restored more than once when a plurality of link files of which restore is requested correspond to the common store file.

11. The method of claim 10 wherein determining whether the common store file needs to be identified for restore comprises accessing a data structure for information identifying the common store file.

12. The method of claim 11 further comprising adding information identifying the common store file to the data structure.

13. The method of claim 10 wherein determining whether the common store file needs to be identified for restore comprises determining whether the common store file is already present on the volume.

14. The method of claim 13 wherein determining whether the common store file is already present on the volume comprises reading a common store directory.

15. The method of claim 10 wherein determining whether the common store file needs to be identified for restore comprises determining if either the common store file has been already identified for restore or if the common store file is already present on the volume.

16. The method of claim 10 wherein receiving information corresponding to a link file comprises receiving a function call from a restore application program.

17. The method of claim 10 wherein identifying the common store file to restore comprises the step of, returning a file name to a restore application program.

18. The method of claim 10 further comprising restoring the link file and the common store file.

19. The method of claim 10 further comprising backing up the link file and the common store file.

20. A computer-readable medium having computer-executable instructions, comprising:

receiving information corresponding to a link file from a backup program, the link file comprising a logically distinct file system file that provides access to corresponding common file data;

determining whether the link file has common data corresponding thereto already identified to the backup program, and if not, identifying the common data to the backup program;

receiving information corresponding to the link file from a restore program for restoring files to a volume;

determining whether the link file has common data corresponding thereto already identified to a restore program;

determining whether the link file has common data corresponding thereto already present on the volume; and identifying the common data to the restore program if the link file has neither common data corresponding thereto already present on the volume nor common data corresponding thereto already identified for restore.

21. The computer-readable medium of claim 20 having further computer-executable instructions for, restoring the link file and the common data.

22. The computer-readable medium of claim 20 having further computer-executable instructions for, backing up the link file and the common data.

23. In a computer system, a system comprising, a backup program for backing up files to a storage medium, an interface that receives link file information from the backup application, each link file comprising a logically distinct file system file that provides access to common file data in a corresponding common store file, a mechanism that determines the common store file corresponding to the link file from the link file information, a data structure configured to record whether the common store file has already been identified to the backup application for backup, and if not already identified for backup, the interface identifying the common store file to the backup application.

24. The system of claim 23 wherein the interface receives function calls from the backup program.

25. The system of claim 24 wherein the interface further receives function calls from a restore program for identifying common store files thereto.

26. The system of claim 23 wherein the interface is incorporated into a dynamic link library.

27. The system of claim 23 wherein the mechanism for determining a common store file corresponding to the link file examines a reparse point of the link file.

* * * * *